US012804607B2

(12) United States Patent
Morshedi et al.

(10) Patent No.: US 12,804,607 B2
(45) Date of Patent: Nov. 17, 2026

(54) SYSTEMS, METHODS, AND DEVICES FOR MIMO PAGE RECOVERY WITH MTPL

(71) Applicant: Apple Inc., Cupertino, CA (US)

(72) Inventors: Ali Morshedi, Poway, CA (US); Xuming Lu, San Jose, CA (US); Drew Mera, San Diego, CA (US); Lakshmi N. Kavuri, San Jose, CA (US); Peng Xiao, San Diego, CA (US); Kexin Ma, San Diego, CA (US); Baohua Zheng, San Diego, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 18/811,656

(22) Filed: Aug. 21, 2024

(65) Prior Publication Data

US 2026/0059494 A1 Feb. 26, 2026

(51) Int. Cl.

| | |
|---|---|
| ***H04W 68/02*** | (2009.01) |
| ***H04W 52/02*** | (2009.01) |
| ***H04W 52/42*** | (2009.01) |
| ***H04W 72/0446*** | (2023.01) |
| ***H04W 88/06*** | (2009.01) |

(52) U.S. Cl.

CPC ....... *H04W 68/02* (2013.01); *H04W 52/0216* (2013.01); *H04W 52/42* (2013.01); *H04W 72/0446* (2013.01); *H04W 88/06* (2013.01)

(58) Field of Classification Search

CPC . H04W 68/02; H04W 52/0216; H04W 52/42; H04W 72/0446; H04W 88/06; H04W 52/146; H04W 52/367

See application file for complete search history.

(56) References Cited

U.S. PATENT DOCUMENTS

2024/0039565 A1 * 2/2024 Vaidya .................... H04B 1/10

* cited by examiner

*Primary Examiner* — Ayanah S George
(74) *Attorney, Agent, or Firm* — Flare IP PLLC

(57) ABSTRACT

Described herein are solutions for multiple input multiple output (MIMO) with maximum transmit power level (MTPL). A user equipment (UE) and/or baseband circuitry can operate with multiple subscriber identity modules (SIMs). The UE can determine a lookup table (LUT) for adjusting an MTPL for a first SIM when a second SIM is to receive a paging message from the network. The adjusted MTPL can be based on one or more factors, such as an operating condition of the UE, a signal strength or condition between the UE and the network, etc. The MTPL for the first SIM can be decreased when the paging message is received and decoded, and then increased thereafter. These and many other features and examples are described herein.

20 Claims, 14 Drawing Sheets

600

610

800

| LOOKUP TABLE (LUT) | | | | | | | |
|---|---|---|---|---|---|---|---|
| INDEX | TX POWER CHANGE (SIM1) | CURRENT TX POWER (SIM1) | RX AGC (SIM2) | TX FREQUENCY (SIM1) | RX FREQUENCY (SIM2) | FREQUENCY DOMAIN PROXIMITY | . . . |
| X | X DB | X MRB DB | X DBM | XTX MHZ | XRX MHZ | XRX HZ | . . . |
| Y | Y DB | YMRB 1DB | Y DBM | YTX MHZ | YRX MHZ | YRX MHZ | . . . |
| . . . | . . . | . . . | . . . | . . . | . . . | . . . | . . . |

*FIG. 8*

SYSTEMS, METHODS, AND DEVICES FOR MIMO PAGE RECOVERY WITH MTPL

FIELD

This disclosure relates to wireless communication networks and mobile device capabilities.

BACKGROUND

Wireless communication networks and wireless communication services are becoming increasingly dynamic, complex, and ubiquitous. For example, some wireless communication networks can be developed to implement fifth generation (5G) or new radio (NR) technology, sixth generation (6G) technology, and so on. Such technology can include solutions for enabling user equipment (UE) and network devices, such as base stations, to communicate with one another.

BRIEF DESCRIPTION OF THE DRAWINGS

The present disclosure will be readily understood and enabled by the detailed description and accompanying figures of the drawings. Like reference numerals can designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and can mean at least one, one or more, etc.

FIG. 8 is a diagram of an example of a LUT for power backoff according to one or more implementations described herein.

DETAILED DESCRIPTION

Figure 1:
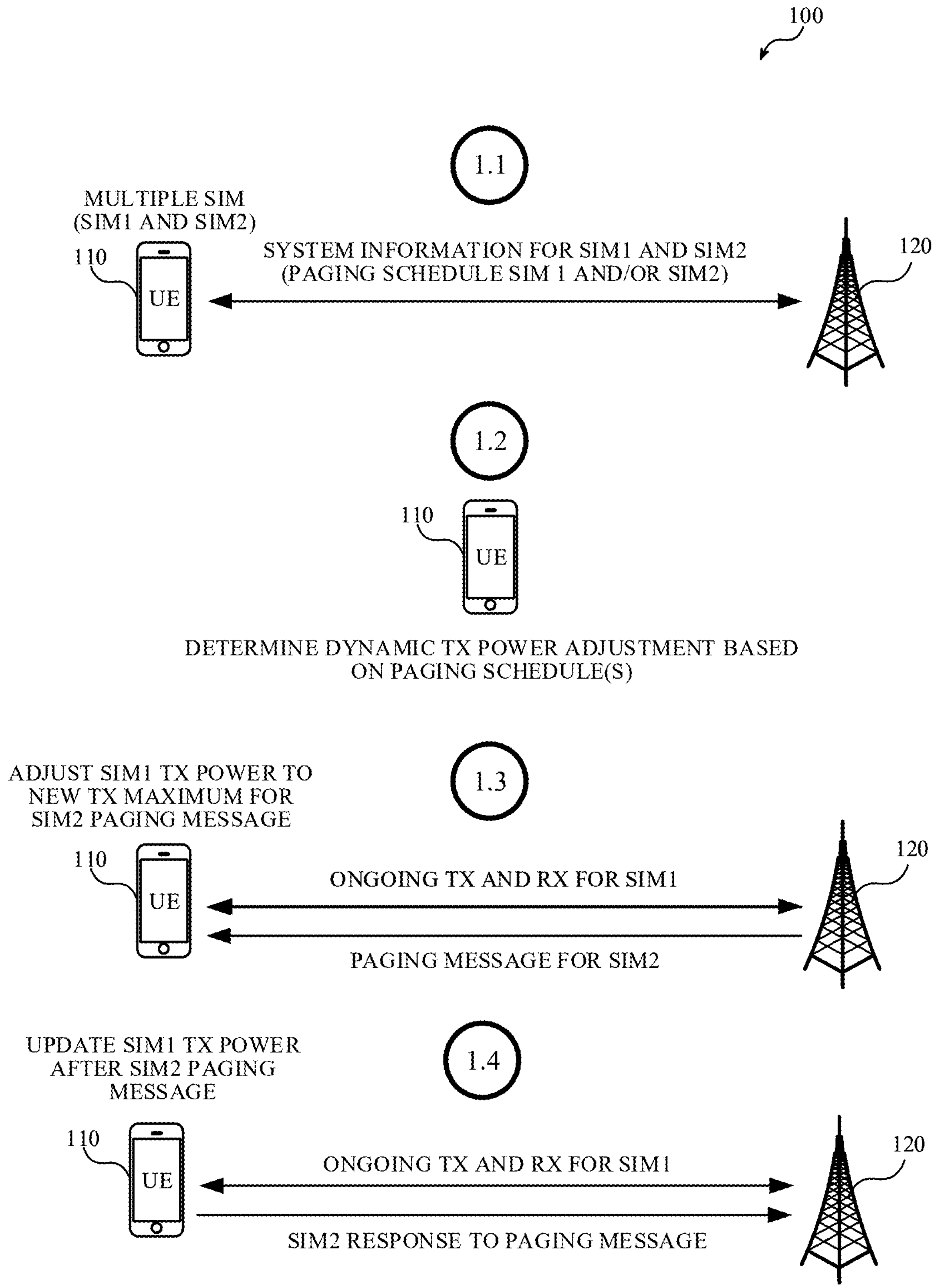
FIG. 1 is a diagram of an example overview of one or more of the techniques described herein.

The following detailed description refers to the accompanying drawings. Like reference numbers in different drawings can identify the same or similar features, elements, operations, etc. Additionally, the present disclosure is not limited to the following description as other implementations can be utilized, and structural or logical changes made, without departing from the scope of the present disclosure.

Wireless communication networks can include user equipment (UE) capable of communicating with base stations and/or other network access nodes. The base stations can provide a UE with access to a core network (CN) and additional external networks, such as the Internet. Wireless communication networks can implement various techniques and standards that enable wireless communications to be reliable, efficient, and commensurate with any number of services being accessed.

UE can be capable of multiple-in-multiple-out (MIMO) communications. MIMO communications can include using multiple transmit antennas and multiple receive antennas for data transmissions. A UE can be in an ACTIVE mode of operation to enable active upload (UL) and download (DL) signaling between the UE and a base station. The UE can enter a power saving mode, such as an IDLE mode (a sleep mode or another type of mode) to conserve power. A base station can prompt the UE to exist the power saving mode by transmitting a paging message (or a page) to the UE during a paging occasion (PO).

A UE can include one or more subscriber identity modules (SIMs). A SIM can be used by the network to identify a user and the UE. The UE can enter active and power saving modes independently for each SIM. Additionally, a UE can implement MIMO for each SIM. For instance, a UE can receive (Rx) a page for one SIM in a power saving mode while transmitting signals for another SIM in an active mode. This can cause transmit (Tx) leakage or self-interference, resulting from a radio transceiver receiving and transmitting signals simultaneously or otherwise overlapping. The Tx leakage can degrade an ability of the UE to receive and decode the paging message, resulting in the SIM being paged to remain in a power saving mode. Currently available solutions for addressing this situation can include the UE refraining from the UL transmissions in order to avoid self-interference. Tuning away can include completely skipping UL transmissions. While this can enable the UE to receive and decode a paging message, doing so can also reduce an ability of the UE for UL transmissions and decrease the user experience.

The techniques described herein can include solutions for UL MIMO page recovery with maximum transmit power level (MTPL). A UE can dynamically determine and adjust how much UL transmission power is to change for one SIM to enable a paging message to be received for another SIM. The UE can, thus, backoff from or reduce the UL transmission power without pausing or completely tuning away from UL transmissions altogether. The change in the UL transmission power can be expressed as a change in a maximum UL transmission power or MTPL, such that an actual transmission power is to remain at or below an updated maximum while the paging message is received. An MTPL can include a maximum power permitted for transmitting a signal. A MTPL characterization can include an MTPL given a set of MIMO Tx and/or Rx circumstances or conditions. The dynamically adjusted MTPL can be particular to an SIM (e.g., for all UL transmissions overlapping with a paging message) or can be particular to a UL transmission, antenna component, data flow, logical channel, application data, etc. Page recovery, as referred to herein, can include an ability of a UE to maintain UL transmissions for one SIM while receiving a paging message for another SIM.

Near-field communications (NFC) can involve device-to-device (D2D), sidelink (SL), and other types of communications between UEs. Far-field communications (FFC) can involve sending and receiving wireless signals over greater distances, such as between a UE and a base station. NFC and FFC can have different characteristics. For example, NFC and FFC can use different transmission powers (e.g., different MTPL), different time resources, different frequency resources, and so on. In some implementations, NNFC and FFC can have similar or overlapping time and/or frequency resources. The techniques described herein can include scenarios where Rx and Tx transmissions can be NFC, FFC, or a combination thereof.

FIG. 1 is a diagram of an example overview 100 of one or more of the implementations described herein. As shown, example overview 100 can include UE 110 and base station 120. UE 110 can include multiple SIMs (e.g., SIM1 and SIM2). A SIM can include a SIM card, SIM circuitry, and/or another type of feature or component configured to enable a network to identify a user or user account of UE 110.

Base station 120 can communicate system information to UE 110 for SIM1 and SIM2 of UE 110 (at 1.1). The system information can include one or more system information blocks (SIBs). The system information can indicate or enable UE 110 to determine a paging schedule for each SIM. UE 110 can determine dynamic Tx power adjustment for the SIMs based on a paging schedule of the SIMs (at 1.2). The paging schedules can be the same or different for each SIM. UE 110 can generate a lookup table (LUT) for implementing changes to a maximum Tx power for one SIM during a paging message or occasion for the other SIM.

UE 110 can continue with Tx and Rx communications with base station 120 for SIM1 and enter a power saving mode (e.g., and IDLE mode) for SIM2 (at 1.3). UE 110 can adjust or update a Tx power for SIM1 in response to a scheduled paging message or occasion for SIM2. The adjusted Tx power can be a change (e.g., a decrease) in a maximum Tx power associated with SIM1. UE 110 can receive a paging message from baes station 120 for SIM2.

UE 110 can again adjust or update the Tx power for SIM1 after the SIM2 paging message is received and/or decoded (at 1.4). The adjusted Tx power can be a change (e.g., an increase) in the maximum Tx power associated with SIM1. The updated maximum Tx power can be the same, or a different, maximum Tx power as the maximum Tx power prior to the paging message. UE 110 can respond to base station 120 regarding the paging message for SIM2. UE 110 can thus maintain UL signaling before, during, and after the paging message for SIM2. Additional examples of these and many other techniques, features, and implementations are described below with reference to the figures that follow.

Figure 2:
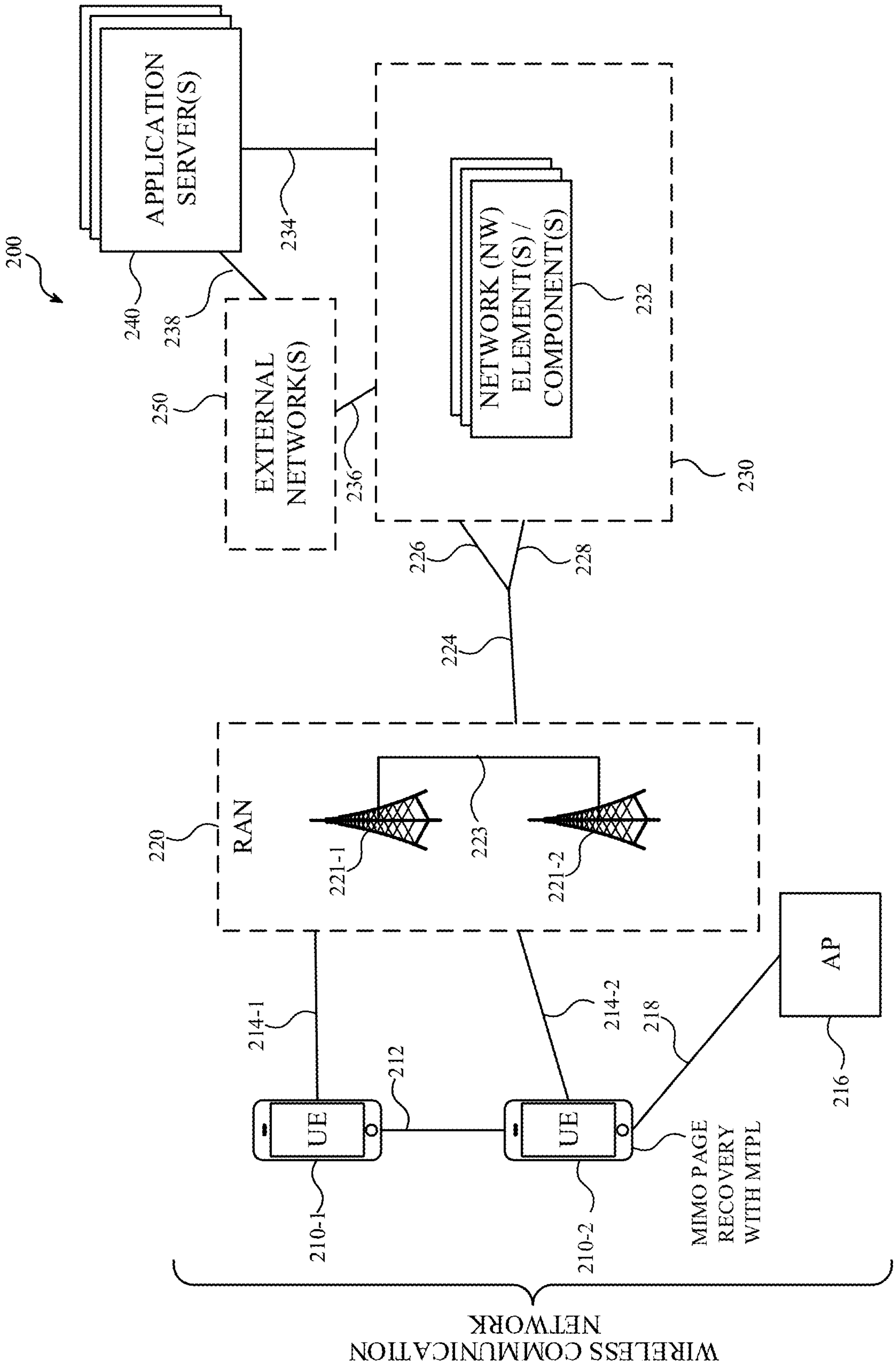
FIG. 2 is a diagram of an example network according to one or more implementations described herein.

FIG. 2 is an example network 200 according to one or more implementations described herein. Example network 200 can include UEs 210, 210-2, etc. (referred to collectively as "UEs 210" and individually as "UE 210"), a radio access network (RAN) 220, a core network (CN) 230, application servers 240, and external networks 250.

The systems and devices of example network 200 can operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 200 can operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 210 can include smartphones (e.g., handheld touchscreen mobile computing devices connectable to one or more wireless communication networks). Additionally, or alternatively, UEs 210 can include other types of mobile or non-mobile computing devices capable of wireless communications, such as personal data assistants (PDAs), pagers, laptop computers, desktop computers, wireless handsets, etc. In some implementations, UEs 210 can include internet of things (IoT) devices (or IoT UEs) that can comprise a network access layer designed for low-power IoT applications utilizing short-lived UE connections. Additionally, or alternatively, an IoT UE can utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data can be a machine-initiated exchange, and an IoT network can include interconnecting IoT UEs (which can include uniquely identifiable embedded computing devices within an Internet infrastructure) with short-lived connections. In some scenarios, IoT UEs can execute background applications (e.g., keep-alive messages, status updates, etc.) to facilitate the connections of the IoT network. UEs 210 can communicate and establish a connection with one or more other UEs 210 via one or more wireless channels 212, each of which can comprise a physical communications interface/layer. The connection can include an M2M connection, MTC connection, D2D connection, SL connection, etc. The connection can involve a PC5 interface. In some implementations, UEs 210 can be configured to discover one another, negotiate wireless resources between one another, and establish connections between one another, without intervention or communications involving RAN node 222 or another type of network node. In some implementations, discovery, authentication, resource negotiation, registration, etc., can involve communications with RAN node 222 or another type of network node.

UEs 210 can use one or more wireless channels 212 to communicate with one another. As described herein, UE 210 can communicate with RAN node 222 to request SL resources. RAN node 222 can respond to the request by providing UE 210 with a dynamic grant (DG) or configured grant (CG) regarding SL resources. A DG can involve a grant based on a grant request from UE 210. A CG can involve a resource grant without a grant request and can be based on a type of service being provided (e.g., services that have strict timing or latency requirements). UE 210 can perform a clear channel assessment (CCA) procedure based on the DG or CG, select SL resources based on the CCA procedure and the DG or CG; and communicate with another UE 210 based on the SL resources. The UE 210 can communicate with RAN node 222 using a licensed frequency band and communicate with the other UE 210 using an unlicensed frequency band.

UEs 210 can communicate and establish a connection with (e.g., be communicatively coupled) with RAN 220, which can involve one or more wireless channels 214-1 and 214-2, each of which can comprise a physical communications interface/layer. In some implementations, a UE can be configured with dual connectivity (DC) as a multi-radio access technology (multi-RAT) or multi-radio dual connectivity (MR-DC), where a multiple receive and transmit (Rx/Tx) capable UE can use resources provided by different RAN network nodes (e.g., RAN network nodes 222-1 and 222-2) that can be connected via non-ideal backhaul (e.g., where one network node provides NR access and the other network node provides either E-UTRA for LTE or NR access for 5G). In such a scenario, one network node can operate as a master node (MN) and the other as the secondary node (SN). The MN and SN can be connected via a network interface, and at least the MN can be connected to the CN 230. Additionally, at least one of the MN or the SN can be operated with shared spectrum channel access, and functions specified for UE 210 can be used for an integrated access and backhaul mobile termination (IAB-MT). Similar for UE 210, the IAB-MT can access the network using either one network node or using two different nodes with enhanced dual connectivity (EN-DC) architectures, new radio dual connectivity (NR-DC) architectures, or the like. In some implementations, a base station (as described herein) can be an example of network RAN network nodes.

As shown, UE 210 can also, or alternatively, connect to access point (AP) 216 via connection interface 218, which can include an air interface enabling UE 210 to communicatively couple with AP 216. AP 216 can comprise a wireless local area network (WLAN), WLAN node, WLAN termination point, etc. The connection 216 can comprise a local wireless connection, such as a connection consistent with any IEEE 702.11 protocol, and AP 216 can comprise a wireless fidelity (Wi-Fi®) router or other AP. While not explicitly depicted in FIG. 2, AP 216 can be connected to another network (e.g., the Internet) without connecting to RAN 220 or CN 230. In some scenarios, UE 210, RAN 220, and AP 216 can be configured to utilize LTE-WLAN aggregation (LWA) techniques or LTE WLAN radio level integration with IPsec tunnel (LWIP) techniques. LWA can involve UE 210 in RRC_CONNECTED being configured by RAN 220 to utilize radio resources of LTE and WLAN. LWIP can involve UE 210 using WLAN radio resources (e.g., connection interface 218) via IPsec protocol tunneling to authenticate and encrypt packets (e.g., Internet Protocol (IP) packets) communicated via connection interface 218. IPsec tunneling can include encapsulating the entirety of original IP packets and adding a new packet header, thereby protecting the original header of the IP packets.

Described herein are solutions for MIMO with MTPL. UE 210, baseband circuitry 1104, RF circuitry 1104, or one or more other components of UE 210, can operate with SIMs. UE 210 can determine a LUT for adjusting an MTPL for a first SIM when a second SIM is to receive a paging message. The adjusted MTPL can be based on one or more factors or conditions, such as an operating status of UE 210, a mode of operation of the SIMs, a signal strength or network condition between UE 210 and the network, etc. The MTPL for the first SIM can be decreased when the paging message is received and decoded, and then increased thereafter. These and many other features and examples are described herein.

RAN 220 can include one or more RAN nodes 222-1 and 222-2 (referred to collectively as RAN nodes 222, and individually as RAN node 222) that enable channels 214-1 and 214-2 to be established between UEs 210 and RAN 220. RAN nodes 222 can include network access points configured to provide radio baseband functions for data and/or voice connectivity between users and the network based on one or more of the communication technologies described herein (e.g., 2G, 3G, 4G, 5G, WiFi®, etc.). As examples therefore, a RAN node can be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 222 can include a roadside unit (RSU), a transmission reception point (TRxP or TRP), and one or more other types of ground stations (e.g., terrestrial access points). In some scenarios, RAN node 222 can be a dedicated physical device, such as a macrocell base station, and/or a low power (LP) base station for providing femtocells, picocells or the like having smaller coverage areas, smaller user capacity, or higher bandwidth compared to macrocells.

Some or all of RAN nodes 222, or portions thereof, can be implemented as one or more software entities running on server computers as part of a virtual network, which can be referred to as a centralized RAN (CRAN) and/or a virtual baseband unit pool (vBBUP). In these implementations, the CRAN or vBBUP can implement a RAN function split, such as a packet data convergence protocol (PDCP) split wherein radio resource control (RRC) and PDCP layers can be operated by the CRAN/vBBUP and other Layer 2 (L2) protocol entities can be operated by individual RAN nodes 222; a media access control (MAC)/physical (PHY) layer split wherein RRC, PDCP, radio link control (RLC), and MAC layers can be operated by the CRAN/vBBUP and the PHY layer can be operated by individual RAN nodes 222; or a "lower PHY" split wherein RRC, PDCP, RLC, MAC layers and upper portions of the PHY layer can be operated by the CRAN/vBBUP and lower portions of the PHY layer can be operated by individual RAN nodes 222. This virtualized framework can allow freed-up processor cores of RAN nodes 222 to perform or execute other virtualized applications.

In some implementations, an individual RAN node 222 can represent individual gNB-distributed units (DUs) connected to a gNB-control unit (CU) via individual F1 or other interfaces. In such implementations, the gNB-DUs can include one or more remote radio heads or radio frequency (RF) front end modules (RFEMs), and the gNB-CU can be operated by a server (not shown) located in RAN 220 or by a server pool (e.g., a group of servers configured to share resources) in a similar manner as the CRAN/vBBUP. Additionally, or alternatively, one or more of RAN nodes 222 can be next generation eNBs (i.e., gNBs) that can provide evolved universal terrestrial radio access (E-UTRA) user plane and control plane protocol terminations toward UEs 210, and that can be connected to a 5G core network (5GC) 230 via an NG interface.

Any of the RAN nodes 222 can terminate an air interface protocol and can be the first point of contact for UEs 210. In some implementations, any of the RAN nodes 222 can fulfill various logical functions for the RAN 220 including, but not limited to, radio network controller (RNC) functions such as radio bearer management, uplink and downlink dynamic radio resource management and data packet scheduling, and mobility management. UEs 210 can be configured to communicate using orthogonal frequency-division multiplexing (OFDM) communication signals with each other or with any of the RAN nodes 222 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals can comprise a plurality of orthogonal subcarriers.

In some implementations, a downlink resource grid can be used for downlink transmissions from any of the RAN nodes 222 to UEs 210, and uplink transmissions can utilize similar techniques. The grid can be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block can comprise a collection of resource elements (REs); in the frequency domain, this can represent the smallest quantity of resources that currently can be allocated. There are several different physical downlink channels that are conveyed using such resource blocks.

Further, RAN nodes 222 can be configured to wirelessly communicate with UEs 210, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum can correspond to channels or frequency bands selected, reserved, regulated, etc., for certain types of wireless activity (e.g., wireless telecommunication network activity), whereas an unlicensed spectrum can correspond to one or more frequency bands that are not restricted for certain types of wireless activity. Whether a particular frequency band corresponds to a licensed medium or an unlicensed medium can depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 210 and the RAN nodes 222 can operate using stand-alone unlicensed operation, licensed assisted access (LAA), eLAA, and/or feLAA mechanisms. In these implementations, UEs 210 and the RAN nodes 222 can perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations can be performed according to a listen-before-talk (LBT) protocol.

The PDSCH can carry user data and higher layer signaling to UEs 210. The physical downlink control channel (PDCCH) can carry information about the transport format and resource allocations related to the PDSCH channel, among other things. The PDCCH can also inform UEs 210 about the transport format, resource allocation, and hybrid automatic repeat request (HARQ) information related to the uplink shared channel. Typically, downlink scheduling (e.g., assigning control and shared channel resource blocks to UE 210 within a cell) can be performed at any of the RAN nodes 222 based on channel quality information fed back from any of UEs 210. The downlink resource assignment information can be sent on the PDCCH used for (e.g., assigned to) each of UEs 210.

The RAN nodes 222 can be configured to communicate with one another via interface 223. In implementations where the system is an LTE system, interface 223 can be an X2 interface. In NR systems, interface 223 can be an Xn interface. The X2 interface can be defined between two or more RAN nodes 222 (e.g., two or more eNBs/gNBs or a combination thereof) that connect to evolved packet core (EPC) or CN 230, or between two eNBs connecting to an EPC. In some implementations, the X2 interface can include an X2 user plane interface (X2-U) and an X2 control plane interface (X2-C).

The X2-U can provide flow control mechanisms for user data packets transferred over the X2 interface and can be used to communicate information about the delivery of user data between eNBs or gNBs. For example, the X2-U can provide specific sequence number information for user data transferred from a master eNB (MeNB) to a secondary eNB (SeNB); information about successful in sequence delivery of PDCP packet data units (PDUs) to a UE 210 from an SeNB for user data; information of PDCP PDUs that were not delivered to a UE 210; information about a current minimum desired buffer size at the SeNB for transmitting to the UE user data; and the like. The X2-C can provide intra-LTE access mobility functionality (e.g., including context transfers from source to target eNBs, user plane transport control, etc.), load management functionality, and inter-cell interference coordination functionality.

As shown, RAN 220 can be connected (e.g., communicatively coupled) to CN 230. RAN 220 communicate with CN 230 via interfaces 224, 226, and/or 228. CN 230 can comprise a plurality of network elements 232, which are configured to offer various data and telecommunications services to customers/subscribers (e.g., users of UEs 210) who are connected to the CN 230 via the RAN 220. In some implementations, CN 230 can include an evolved packet core (EPC), a 5G CN, and/or one or more additional or alternative types of CNs. The components of the CN 230 can be implemented in one physical node, or separate physical nodes including components to read and execute instructions from a machine-readable or computer-readable medium (e.g., a non-transitory machine-readable storage medium).

In some implementations, network function virtualization (NFV) can be utilized to virtualize any or all the above-described network node roles or functions via executable instructions stored in one or more computer-readable storage mediums (described in further detail below). A logical instantiation of the CN 230 can be referred to as a network slice, and a logical instantiation of a portion of the CN 230 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

As shown, CN 230, application servers 240, and external networks 250 can be connected to one another via interfaces 234, 236, and 238, which can include IP network interfaces. Application servers 240 can include one or more server devices or network elements (e.g., virtual network functions (VNFs) offering applications that use IP bearer resources with CN 230 (e.g., universal mobile telecommunications system packet services (UMTS PS) domain, LTE PS data services, etc.). Application servers 240 can also, or alternatively, be configured to support one or more communication services (e.g., voice over IP (VoIP) sessions, push-to-talk (PTT) sessions, group communication sessions, social networking services, etc.) for UEs 210 via the CN 230. Similarly, external networks 250 can include one or more of a variety of networks, including the Internet, thereby providing the mobile communication network and UEs 210 of the network access to a variety of additional services, information, interconnectivity, and other network features.

Figure 3:
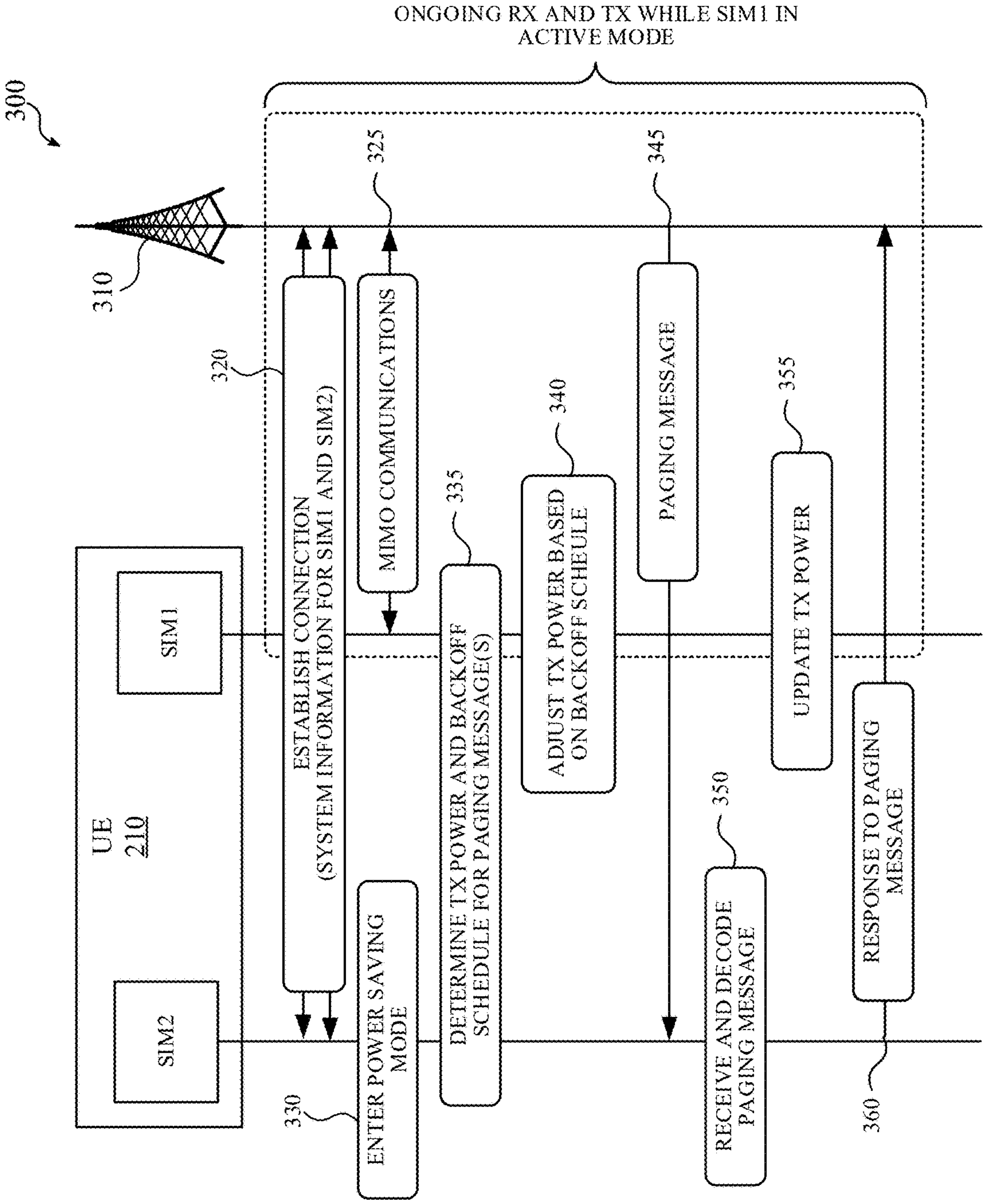
FIG. 3 is a diagram of an example of a process for multiple input multiple output (MIMO) page recovery with maximum transmit power level (MTPL) according to one or more implementations described herein.

FIG. 3 is a diagram of an example of a process 300 for MIMO page recovery with MTPL according to one or more implementations described herein. As shown, process 300 can include UE 210 and base station 310, which can be an example of RAN node 222 of FIG. 2. UE 210 can include multiple SIMs (e.g., SIM1 and SIM2). In some implementations, some or all of process 300 can be performed by one or more other systems or devices, including one or more of the devices of FIG. 2 and/or one or more of the components of UE 210, such as baseband circuitry, RF circuitry, etc. Additionally, process 300 can include one or more fewer, additional, differently ordered and/or arranged operations than those shown in FIG. 3. In some implementations, some or all of the operations of process 300 can be performed independently, successively, simultaneously, etc., of one or more of the other operations of process 300. As such, the techniques described herein are not limited to a number, sequence, arrangement, timing, etc., of the operations or processes depicted in FIG. 3.

As shown, process 300 can include UE 210 and base station 310 communicating to establish a connection for SIM1 and SIM2 (at 320). For example, base station 310 can send UE 210 system information for SIM1 and SIM2. The system information can include one or more system information blocks (SIB). The SIB can include SIB1 and/or one or more other SIBs. Base station 310 can also allocate or configure time and frequency resources to UE 210, which can be used to establish UL and DL channels. As described below, the system information can be used to enable MIMO page recovery with MTPL for SIM1 and SIM2. In some implementations, base station 310 can send system information for only one SIM (e.g., SIM1), and the system information can be used to implement MIMO page recovery with MTPL involving a paging message for another SIM (e.g., SIM2).

Process 300 can include MIMO communications between UE 210 and base station 310 for SIM1 (at 325). For example, UE 210 can use the connection with base station 310 to access one or more network services. Examples of such service can include any variety of network services, such as a voice or video call, accessing an augmented reality (AR) service or virtual reality (VR) service, streaming data in the UL and/or DL direction, and more. One or more of the components of UE 210 (e.g., baseband circuitry, RF circuitry, etc.) can remain in an active mode during the MIMO communications involving SIM1.

Process 300 can also include SIM2 entering a power saving mode (at 330). One or more of the components or resources of UE 210 can be allocated to SIM1. A different set of components or resources of UE 210 can be allocated to SIM2. While the components or resources of UE 210 remain in an ACTIVE mode, the components or resources of UE 210 for SIM2 can enter a power saving mode. The power saving mode can include a sleep mode, an IDLE mode, and/or one or more other types of modes of operation relating to reduced power usage, UL transmissions, and/or DL transmissions.

Process 300 can include UE 210 determining a Tx power and backoff schedule for paging messages (at 335). For example, UE 210 can determine a transmit power to be used for SIM1 prior to, during, and after a paging message and/or PO directed to SIM2. The Tx power can include a change in Tx power associated with UL transmissions for SIM1. The change in Tx power can include a change in a maximum Tx power (e.g., a change in a MTPL associated with SIM1). The Tx power can be determined based on a current Tx power associated with SIM1, signal associated with base station 310, a bandwidth allocated to SIM1, a resource block (RB) configuration of SIM1, and/or one or more other types of conditions or characteristics. The change in Tx power be based on one or more signaling conditions measured by UE 210, such as a reference signal received power (RSRP), received signal strength indicator (RSSI), a signal-to-noise ratio (SNR), a level of signal interference, etc.

UE 210 can also determine a backoff schedule for applying the change in the UL transmit power. The backoff schedule can include a paging schedule for SIM2. The backoff schedule can be referred to herein as a paging schedule. The backoff schedule can be based on time and scheduling information included in, or referenced by, the system information from base station 310. The backoff schedule can be explicitly indicated by the system information or implicitly determined by UE 210 based on the system information. The backoff schedule can include time gap information, duration information, periodicity information, number of repeat attempts, hybrid automatic repeat-request (HARQ) information, and/or one or more other types of information. In some implementations, UE 210 can determine the backoff schedule based on one or more other types of information.

The backoff schedule can include a time division duplex (TDD) pattern associated with SIM1 and/or SIM2. The TDD pattern can include TDD slots. The TDD pattern can include TDD resources allocated to SIM1, TDD resources allocated to paging SIM2, and/or information indicating an overlap of TDD resources allocated to SIM1 and TDD resources for paging SIM2. In some implementations, overlapping TDD resources can include, or be limited to, TDD resources associated with conflicting or interfering frequency resources. For example, the backoff schedule can include TDD slots involving an overlap of UL TDD resources allocated to SIM1 and DL TDD resources allocated to paging SIM2, in so much as the TDD resources also involve frequency domain resources identified as conflicting or interfering with one another.

UE 210 can determine the Tx power and backoff schedule for SIM2 only or for both SIM1 and SIM2. For example, UE 210 can determine the Tx power and backoff schedule for SIM2 in response to SIM2 entering a power saving mode. UE 210 can determine a Tx power and backoff schedule for SIM1 if/when SIM1 enters a power saving mode. In some implementations, a Tx power and backoff schedule for one SIM can be applied to another SIM. In some implementations, the Tx power and/or backoff schedule for one SIM can be determined based on system information, time domain resources, and/or frequency resources associated with a different SIM. UE 210 can generate a LUT indicating the change in Tx power and/or the backoff schedule.

The change in Tx power can be indicated by the LUT as a Tx power associated with a paging instance of the backoff schedule. UE 210 can store the LUT in a local memory, which can include volatile or non-volatile memory. While not shown, UE 210 can determine (or update) the Tx power and backoff schedule in response to one or more triggers. Examples of such triggers can include upon expiration of an expiration timer associated with the Tx power and/or backoff schedule, a handoff procedure from base station 310 to another base station, a change in time and/or frequency resources allocated to SIM1, a change in system information from base station 310, and/or one or more triggers or changes.

Process 300 can include UE 210 adjusting a Tx power based on the backoff schedule (at 340). For example, UE 210 can change a Tx power associated with SIM1 based on a backoff schedule associated with paging SIM2. Prior to a paging occasion or predicted paging message, UE 210 can access the LUT and change the Tx power of SIM1 according to the LUT. The LUT can indicate the TDD slot pattern for which the change in Tx power is to occur. UE 210 can change the Tx power for SIM1 for the TDD slots indicated by the LUT. The TDD slots can be limited to the TDD slots overlapping with the paging message. The change in the Tx power can be a change in a MTPL associated with SIM1. As such, an actual Tx power for SIM1 can be different than the change in Tx power so long as the actual Tx power is at or below the updated or adjusted MTPL.

In some implementations, UE 210 can generate one or more LUTs corresponding to different conditions or scenarios (e.g., different signaling conditions between UE 210 and base station 310). UE 210 can determine which LUT corresponds to current conditions and adjust a Tx power of SIM1 based on the determined LUT. Adjusting the Tx power can include a change in a maximum and/or actual Tx power of SIM1. For example, UE 210 can change a maximum Tx power associated with SIM1, determine whether a current Tx power for SIM1 exceeds the new maximum Tx power, and decrease the current Tx power to comply with the new maximum when the actual Tx power exceeds the current Tx power.

Process 300 can include base station 310 sending a paging message to UE 210 (at 345). For example, UE 210 can monitor a PO according to a paging schedule associated with SIM2 and/or base station 310. UE 210 can detect a paging message during the PO. Process 300 can include UE 210 receiving and decoding the paging message (at 350). While the paging messaging is being received, UE 210 can continue to transmit UL signals to base station 310 in accordance with the adjusted Tx power.

Process 300 can include UE 210 updating the Tx power for SIM1 (at 355). For example, UE 210 can restore a default or original Tx power level (e.g., MTPL). The updated Tx power can be equal to the Tx power used prior to the paging message or PO. The updated Tx power can therefore be an increase in an MTPL and/or an increase in an actual UL transmit power for SIM1. While not shown, UE 210 can determine a Tx power (or a maximum Tx power) for SIM2. The maximum Tx power can be a default or original Tx power level, which can be the same as or different than the maximum Tx power and/or actual Tx power associated with SIM1. In some implementations, UE 210 can update the maximum Tx power for SIM1 in response to determining or verifying that the paging message for SIM2 was successfully received and/or decoded. In some implementations, UE can update the maximum Tx power for SIM1 in response to one or more additional, or alterative, triggers or conditions, such as detecting an expiration of a timer, UE 210 responding to the paging message, etc. Process 300 can include UE 210 responding to the paging message associated with SIM2 (at 360).

Figure 4:
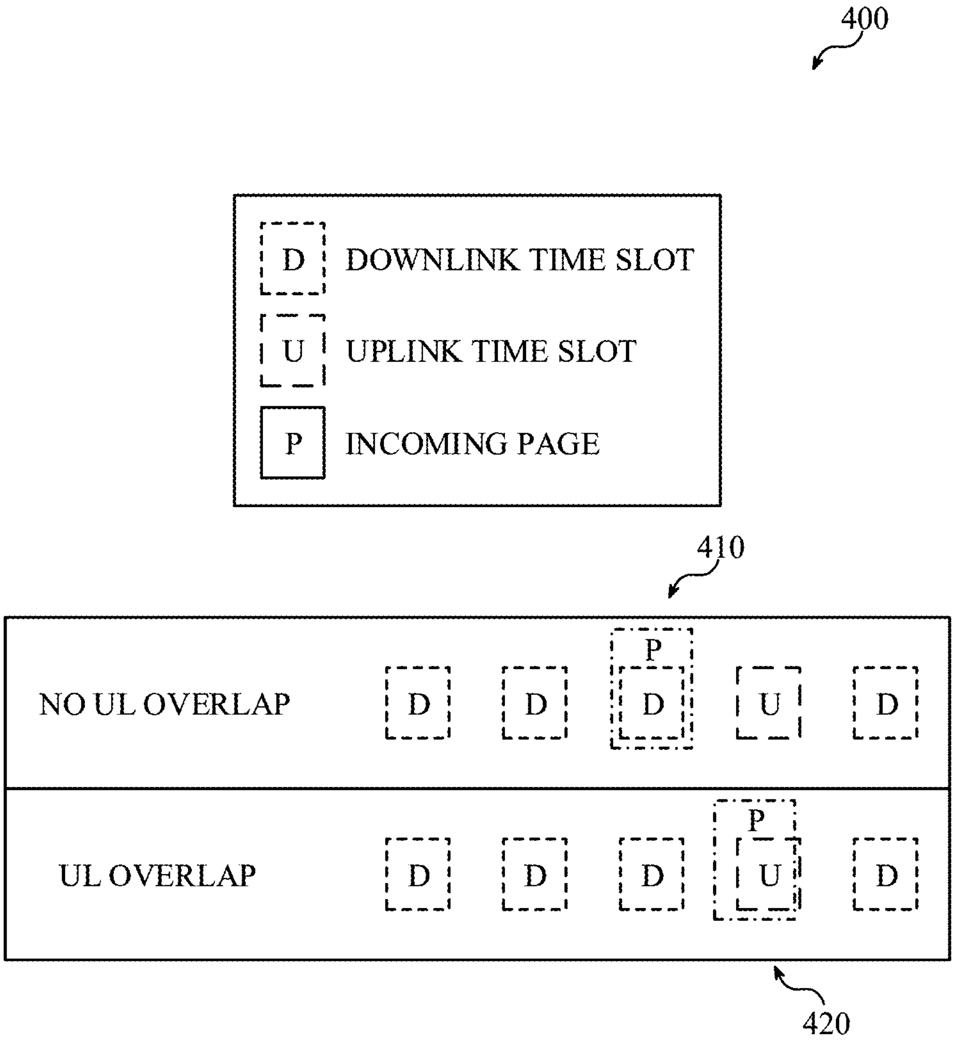
FIG. 4 is a diagram of an example of paging messages that overlap with time and frequency resources according to one or more implementations described herein.

FIG. 4 is a diagram of an example 400 of paging messages that overlap with time and frequency resources according to one or more implementations described herein. As shown, example 400 can include DL time slots, UL time slots, and an incoming page. The page can be referred to herein as a paging message. When a DL transmission overlaps with time resources (e.g., slots) allocated to a paging message, UE 210 can be configured to determine that such a scenario does not amount to a conflict for purposes of the techniques described herein. This can be due to the overlapping slots being limited to DL transmissions. By contrast, when a UL transmission overlaps with time resources (e.g., slots) allocated to a paging message, UE 210 can be configured to determine that such a scenario does amount to a conflict for purposes of the techniques described herein. This can be due to the overlapping slots being involving UL and DL transmissions. In some implementations, UE 210 can be configured to determine that overlapping UL and DL slots amounts to a conflict when frequency resources (e.g., carriers, RBs, BWPs, etc.) overlap with one another or are withing a frequency range threshold (e.g., within a minimum subcarrier spacing (SCS)) of one another.

Figure 5:
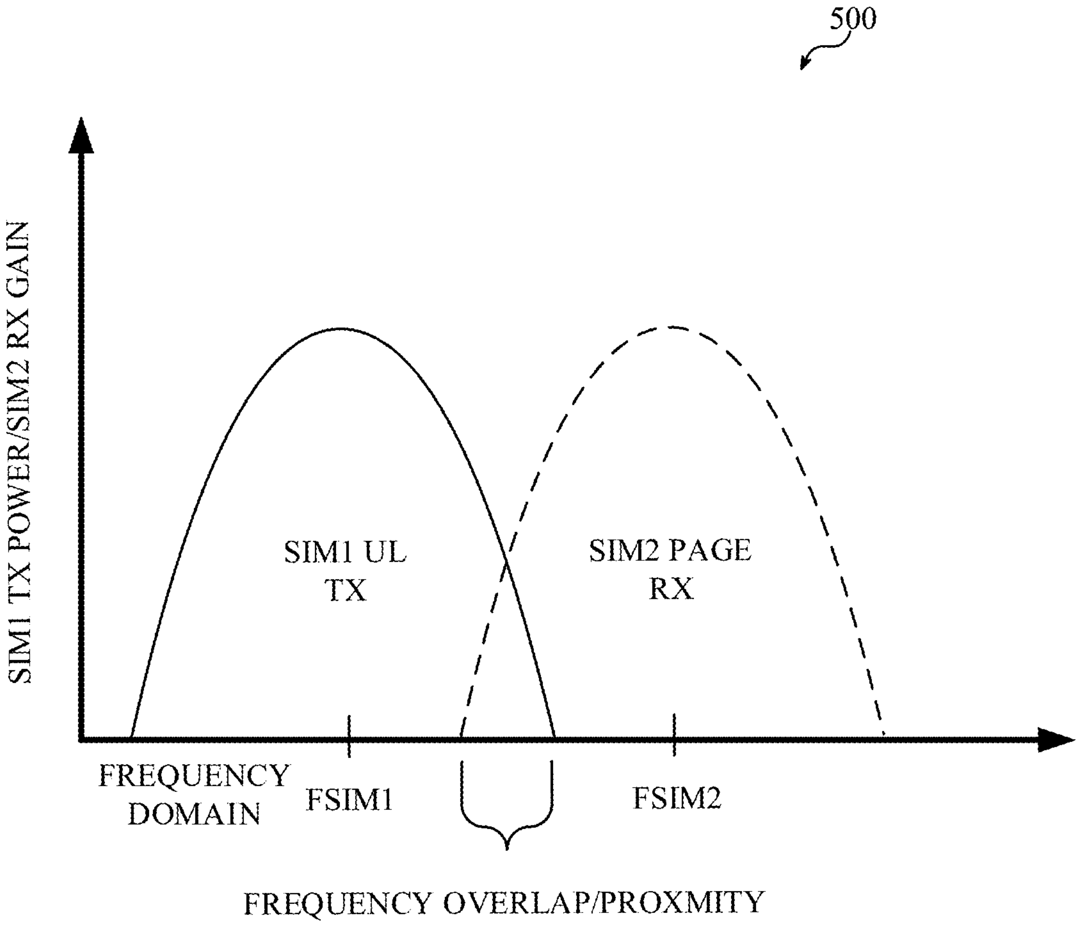
FIG. 5 is a diagram of an example of a transmit (Tx) leakage resulting from an uplink (UL) multiple input multiple output (MIMO) transmission overlapping with a received (Rx) paging message for different subscriber identity modules (SIMs) according to one or more implementations described herein.

FIG. 5 is a diagram of an example 500 of Tx leakage resulting from a UL MIMO transmission overlapping with an Rx paging message. Example 500 can represent a scenario involving ultra-high bandwidth (UHB) power amplifier and duplexer (PAD) module, which can include any module that can Tx and Rx at the same time or at overlapping times. A vertical axis of example 500 can represent a Tx power of SIM1 TX and an Rx automatic gain control (AGC) of SIM2. A horizontal axis of example 500 can include a proximity and/or overlap of frequency resources allocated to SIM1 Tx and SIM2 Rx. According to example 500, UE 210 can be capable of successfully receiving and decoding a paging message for SIM2 based on a Tx power for SIM1, a signal strength or gain of SIM2 Rx, and a proximity of Tx and Rx frequency resources. Additional examples are provided below. The Tx gain for SIM1, and the Rx gain for SIM2 are represented in FIG. 5, though not necessarily to scale.

Figure 6:
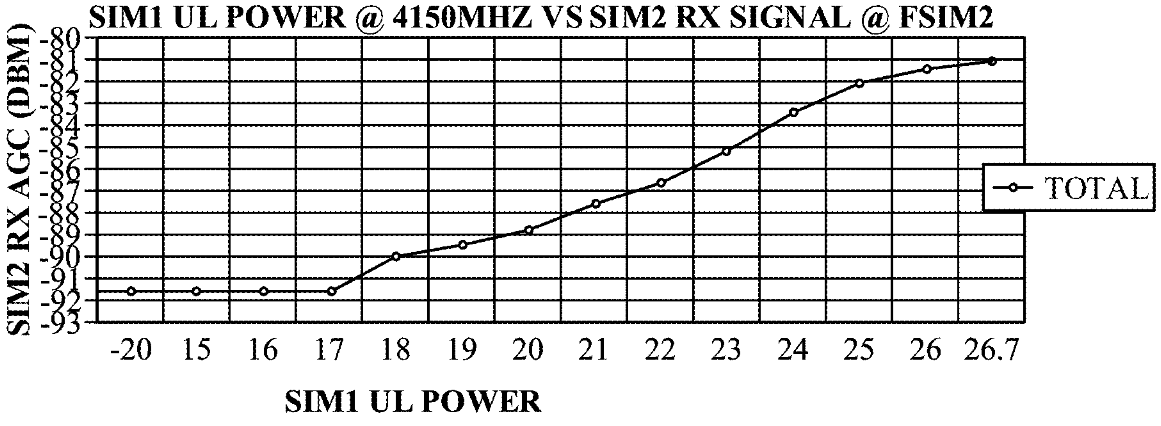
FIG. 6 is a diagram of an example of a relationship between Tx power, receive (Rx) automatic gain control (AGC), and frequency proximity of overlapping uplink (UL) and downlink (DL) signaling according to one or more implementations described herein.
Figure 6:
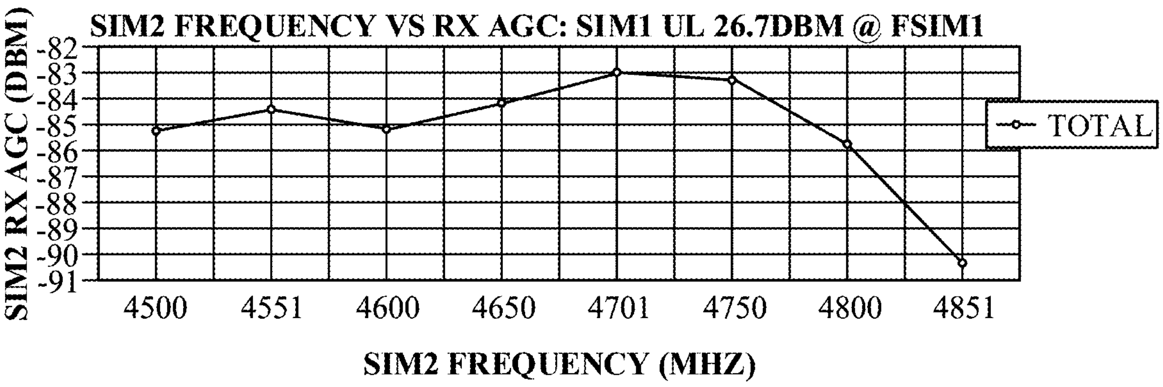

FIG. 6 is a diagram of examples 600 and 610 of a relationship between Tx power, Rx AGC, and frequency proximity of overlapping UL and DL signaling according to one or more implementations described herein. Referring to example 600, when slots of a Tx for SIM1 overlaps with slots of a paging message for SIM2, whether UE 210 is capable of receiving and/or decoding the paging message can depend on a UL Tx power for SIM1 and an Rx AGC associated with SIM2. UE 210 can determine whether (and how much) a Tx power for SIM1 is to change based on a combination of the current Tx power for SIM1 and/or an Rx AGC for SIM2. The higher the current Tx power for SIM1, the greater the change in the Tx power proscribed by UE 210.

Referring to example 610, when slots of a Tx for SIM1 overlaps with slots of a paging message for SIM2, whether UE 210 is capable of receiving and/or decoding the paging message can depend on frequency proximity between the frequency resources allocated to the paging message and the frequency resources allocated to the UL Tx. The frequency resources can include a carrier, BWP, channel, sub-channel, carrier, sub-carrier, sub-carrier spacing, RBs, etc.). UE 210 can be configured to determine whether (and how much) to change a Tx power of overlapping UL and DL slots based on a proximity of the frequency resources allocated to the paging message for SIM2 and the frequency resources of the UL Tx. The closer the frequency resources, the greater the change in Tx power proscribed by UE 210.

UE 210 can be configured to determine a change in Tx power and/or a change in a MTPL based on a current Tx power for SIM1, a current MTPL for SIM1, an Rx AGC for SIM2, a proximity of frequency resources for UL Tx and Rx paging, and/or a combination thereof. In some implementations, UE 210 can be configured to determine the change in Tx power based on a threshold level of confidence associated with the paging message being successful received and decoded for SIM2. UE 210 can determine the change in Tx power based on a Tx power characterization. The Tx power characterization can pertain to a MTPL and can be based on the current factors and conditions relating to Tx and Rx for UE 210. For example, the characterization can be based on (or include) a current Tx power for SIM1, a current MTPL for SIM1, an Rx AGC for SIM2, a proximity of frequency resources for UL Tx and Rx paging, and/or a combination thereof.

Figure 7:
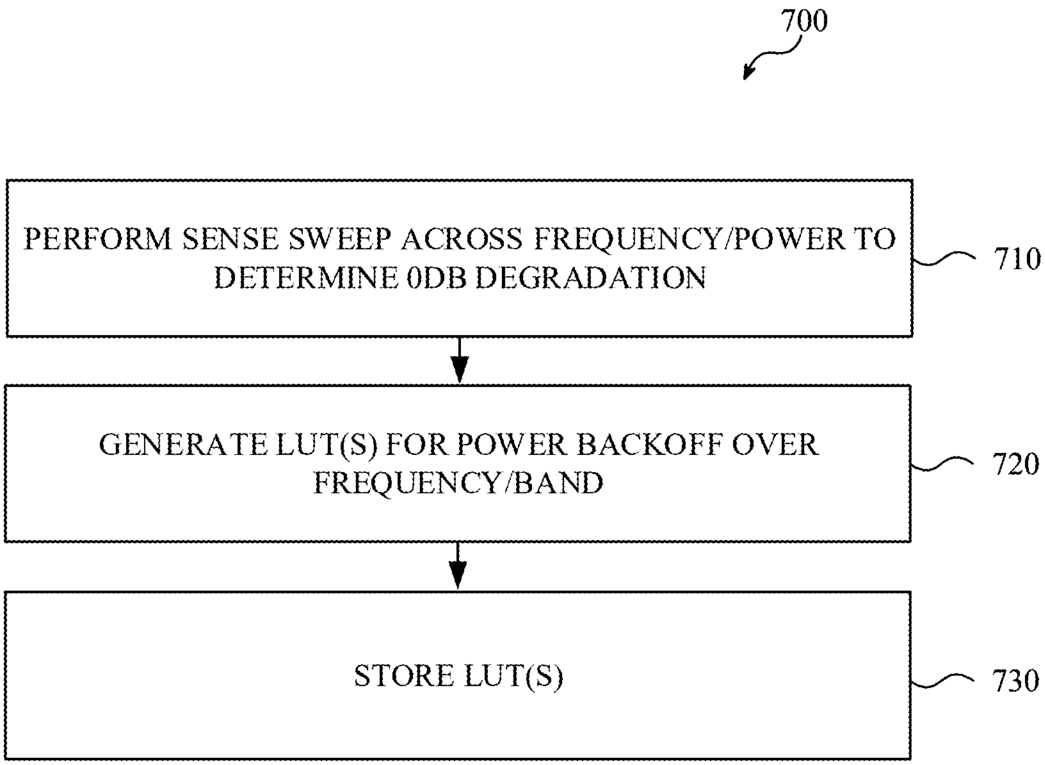
FIG. 7 is a diagram of an example of a process for generating a lookup table (LUT) for power backoff according to one or more implementations described herein.

FIG. 7 is a diagram of an example of a process 700 for generating a LUT for power backoff according to one or more implementations described herein. Process 700 can include an example of determining a Tx power and backoff schedule for a paging message (see, block 335 of FIG. 3). As shown, process 700 can be performed by UE 210. In some implementations, some or all of process 700 can be performed by one or more other systems or devices, including one or more of the devices of FIG. 2 and/or one or more of the components of UE 210, such as baseband circuitry, RF circuitry, etc. Additionally, process 700 can include one or more fewer, additional, differently ordered and/or arranged operations than those shown in FIG. 7. In some implementations, some or all of the operations of process 700 can be performed independently, successively, simultaneously, etc., of one or more of the other operations of process 300 or 700. As such, the techniques described herein are not limited to a number, sequence, arrangement, timing, etc., of the operations or processes depicted in FIG. 7.

Process 700 can include performing a sense sweep across frequency and Tx powers to determine configurations for 0 dB degradation. For example, UE 210 can perform a beam, band, and/or carrier sweep based on a signal pattern and/or allocation of wireless resources associated with UE 210 and/or base station 310. UE 210 can determine or identify 0 dB degradation. 0 dB backoff can be implemented when there is no degradation to SIM2 paging quality with maximum TX power on SIM1. Usually, as the SIM2 frequency is closer to the SIM1 TX frequency, degradation can occur and more than 0 dB backoff can be implemented, as represented in FIG. 5 and FIG. 6. A sense sweep, as described herein, can include a procedure to characterize each possible SIM1 Tx and SIM2 Rx frequency according to an increase in Tx power of SIM1 and Rx sensitivity degradation. For example if SIM2 RX sensitivity degradation is observed when SIM1 Tx power is 18 dBm, an MTPL switch point can be set to 17 dBm so there is no or an acceptable amount of degradation to SIM2 paging message. This characterization procedure can be applied to all possible Tx and Rx frequencies to, for example, create a LUT for identifying a proper MTPL backoff for a given scenario such that there is no degradation to the SIM2 page.

Process 700 can include generating LUTs for power backoff over a frequency/band (block 720). For example, UE 210 can determine one or more LUTs for performing a power fallback procedure. Each power fallback procedure can be associated with a change in Tx power and/or a change in Tx maximum power. Each power fallback procedure can also, or alternatively, be associated with one or more, or a set, of frequencies, bands, and/or another type of frequency resources (e.g., RBs, BWP, sub-band, channels, etc.). Process 700 can include storing the LUTs (block 730). For example, UE 210 can store one or more LUTs in a local memory or other type of storage device. The LUTs can be stored in volatile, non-volatile memory, or a combination thereof. A power backoff procedure can include a change in Tx power and/or a change in a maximum Tx power associated with an SIM.

FIG. 8 is a diagram of an example of a LUT 800 for power backoff according to one or more implementations described herein. LUT 800 can include columns associated with one or more conditions or attributes of a power backoff scenario. As shown, the columns of LUT 800 can include an index, a Tx power change, current Tx power of SIM1, Rx AGC of SIM2, Tx frequency of SIM1, Rx frequency of SIM2, a proximity of Tx and Rx frequency domain resources, and more. Each row of LUT 800 can correspond to an instance of applying power backoff as describe herein. A first row of LUT 800 can include attributes corresponding to instance X for power backoff. As shown, the row can include values for an X index, X multicast radio bearer (MRB) dB, $X_{TN}$ megahertz (MHz), $X_{RX}$ MHz, and an indicator of Tx and Rx slot overlap. A second row can include similar attributes for an instance for Y. Values X and Y are used for rows one and two, respectively, to indicate what the values correspond to an instance described by corresponding conditions. Different values of X can be different. For instance, the value X can be a different value for each of the index column, Tx power change column, current Tx power column, Rx AGC column, and so on.

LUT 800 includes an example data structure that can be generated by UE 210 and/or stored by UE 210. In some implementations, UE 210 can be configured to dynamically generate LUT 800. In some implementations, UE 210 can be configured to store LUT 800 by default, according to a UE type, UE configuration, UE capabilities, etc. One or more values X, Y, etc., can include a range of values and/or express a threshold value. In some implementations, LUT 800 can include one or more fewer, additional, differently ordered and/or arranged attributes, values, or data than those shown in FIG. 8. As such, the techniques described herein are not limited to a number, sequence, arrangement, type, etc., of the information shown in LUT 800.

Figure 9:
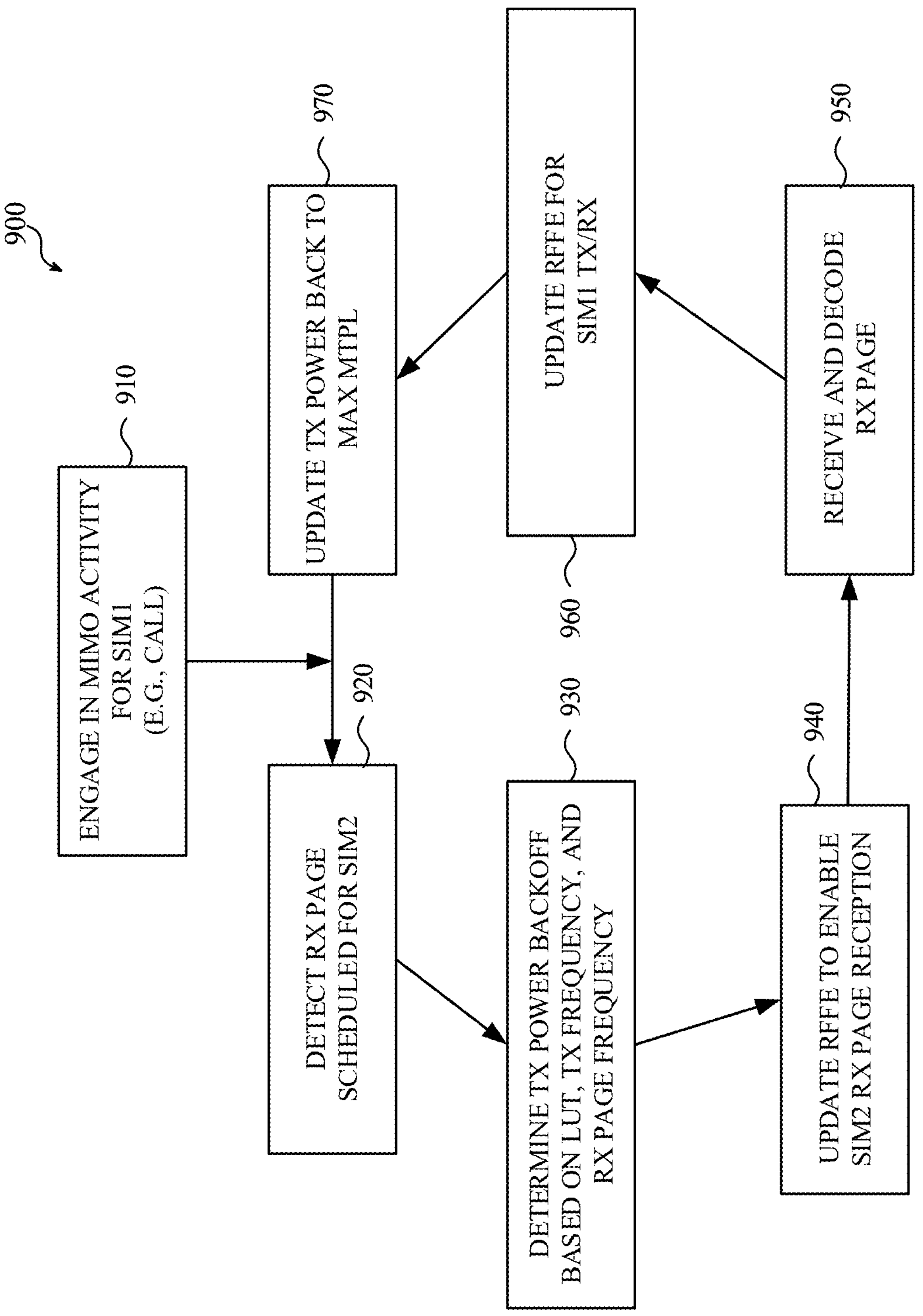
FIG. 9 is a diagram of an example of a process for MIMO page recovery with MTPL according to one or more implementations described herein.

FIG. 9 is a diagram of an example of a process for MIMO page recovery with MTPL according to one or more implementations described herein. Process 900 can include an example of determining a Tx power and backoff schedule for a paging message (see, block 335 of FIG. 3). As shown, process 900 can be performed by UE 210. In some implementations, some or all of process 900 can be performed by one or more other systems or devices, including one or more of the devices of FIG. 2 and/or one or more of the components of UE 210, such as baseband circuitry, RF circuitry, etc. Additionally, process 900 can include one or more fewer, additional, differently ordered and/or arranged operations than those shown in FIG. 9. In some implementations, some or all of the operations of process 900 can be performed independently, successively, simultaneously, etc., of one or more of the other operations of process 300 or 900. As such, the techniques described herein are not limited to a number, sequence, arrangement, timing, etc., of the operations or processes depicted in FIG. 9.

As shown, process 900 can include UE 210 engaging in MIMO communications for SIM1 (block 910). The MIMO communications can include a voice call, video call, data streaming, and/or one or more other times of communications involving the transmission of data. Process 900 can include UE 210 detecting an Rx page (or paging message) scheduled for SIM2 (block 920). Process 900 can also include UE 210 determining a Tx power backoff based on a LUT, Tx frequency, and Rx frequency for the paging message (block 930). Process 900 can include UE 210 updating an RF front end radio frequency front-end (RFFE) to enable reception of the Rx paging message for SIM2 (block 940). For example, UE 210 can decrease an MTPL associated with Tx for SIB1 based on a change in Tx indicating in an LUT. Process 900 can include UE 210 receiving and/or decoding the Rx paging message (block 950). Process 900 can include UE 210 updating an RFFE component associated with Tx and/or Rx for SIM1 (block 960). Process 900 can include UE 210 updating a Tx power for SIM1 back to a maximum MTPL (block 970). For example, after the paging message for SIM2 is received and/or decoded, UE 210 can restore or update an MTPL for SIB1 to a maximum MTPL. Process 900 can continue with detecting an Rx page schedule for the SIM2 (block 920).

Figure 10:
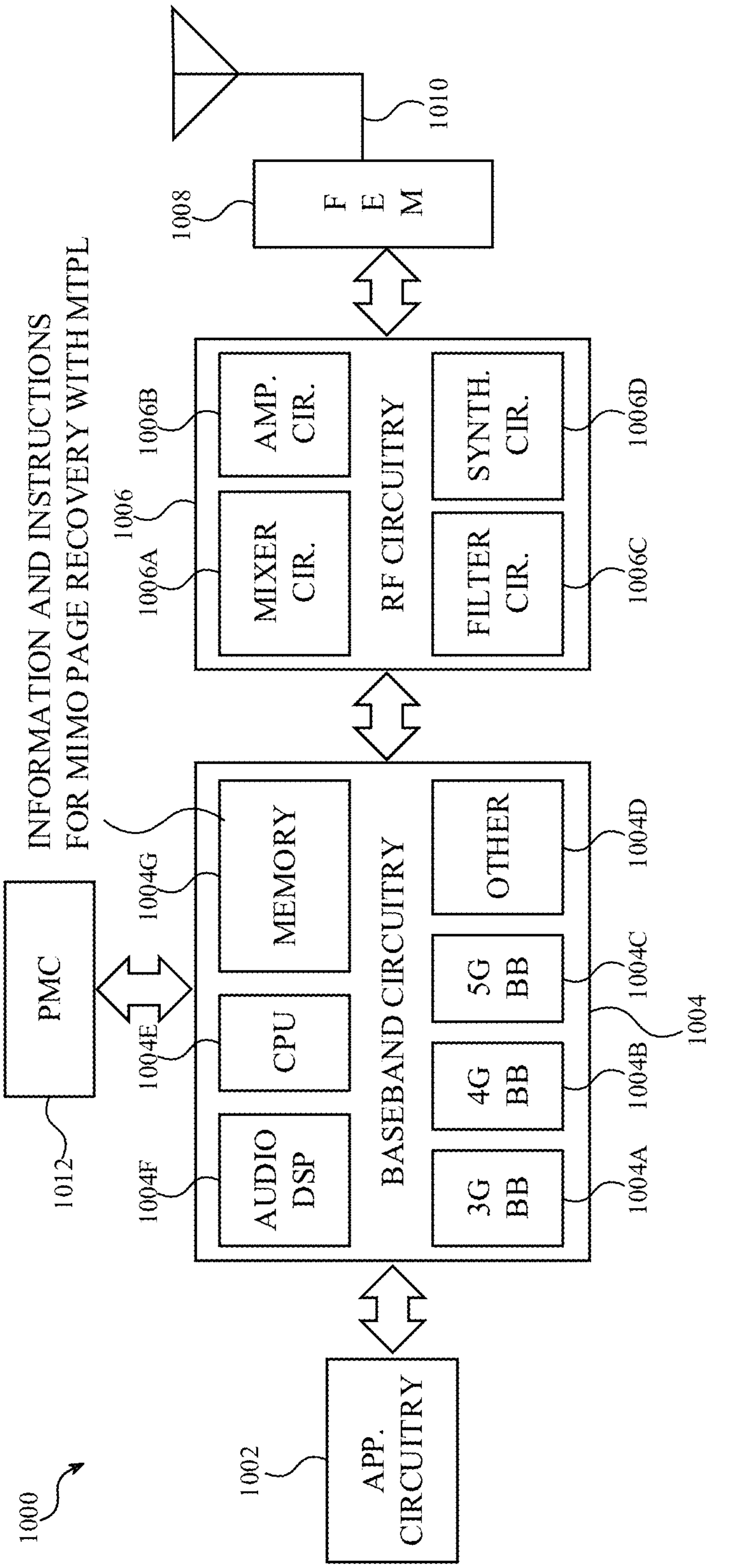
FIG. 10 is a diagram of an example of components of a device according to one or more implementations described herein.

FIG. 10 is a diagram of an example of components of a device according to one or more implementations described herein. In some implementations, the device 1000 can include application circuitry 1002, baseband circuitry 1004, RF circuitry 1006, front-end module (FEM) circuitry 1008, one or more antennas 1010, and power management circuitry (PMC) 1012 coupled together at least as shown. The components of the illustrated device 1000 can be included in a UE or a RAN node. In some implementations, the device 1000 can include fewer elements (e.g., a RAN node may not utilize application circuitry 1002, and instead include a processor/controller to process IP data received from a CN or an Evolved Packet Core (EPC)). In some implementations, the device 1000 can include additional elements such as, for example, memory/storage, display, camera, sensor (including one or more temperature sensors, such as a single temperature sensor, a plurality of temperature sensors at different locations in device 1000, etc.), or input/output (I/O) interface. In other implementations, the components described below can be included in more than one device (e.g., said circuitries can be separately included in more than one device for Cloud-RAN (C-RAN) implementations).

The application circuitry 1002 can include one or more application processors. For example, the application circuitry 1002 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1000. In some implementations, processors of application circuitry 1002 can process IP data packets received from an EPC.

The baseband circuitry 1004 can include circuitry such as, but not limited to, one or more single-core or multi-core processors. The baseband circuitry 1004 can include one or more baseband processors or control logic to process baseband signals received from a receive signal path of the RF circuitry 1006 and to generate baseband signals for a transmit signal path of the RF circuitry 1006. Baseband circuity 1004 can interface with the application circuitry 1002 for generation and processing of the baseband signals and for controlling operations of the RF circuitry 1006. For example, in some implementations, the baseband circuitry 1004 can include a 3G baseband processor 1004A, a 4G baseband processor 1004B, a 5G baseband processor 1004C, or other baseband processor(s) 1004D for other existing generations, generations in development or to be developed in the future (e.g., 5G, 6G, etc.). The baseband circuitry 1004 (e.g., one or more of baseband processors 1004A-D) can handle various radio control functions that enable communication with one or more radio networks via the RF circuitry 1006. In other implementations, some or all of the functionality of baseband processors 1004A-D can be included in modules stored in the memory 1004G and executed via a Central Processing Unit (CPU) 1004E. The radio control functions can include, but are not limited to, signal modulation/demodulation, encoding/decoding, radio frequency shifting, etc. In some implementations, modulation/demodulation circuitry of the baseband circuitry 1004 can include Fast-Fourier Transform (FFT), precoding, or constellation mapping/de-mapping functionality. In some implementations, encoding/decoding circuitry of the baseband circuitry 1004 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, memory 1004G can receive and/or store information and instructions for MIMO with MTPL. UE 210, baseband circuitry 1004, RF circuitry 1004, or one or more other components of UE 210, can operate with SIMs. UE 210 can determine a LUT for adjusting an MTPL for a first SIM when a second SIM is to receive a paging message. The adjusted MTPL can be based on one or more factors or conditions, such as an operating status of UE 210, a mode of operation of the SIMs, a signal strength or network condition between UE 210 and the network, etc. The MTPL for the first SIM can be decreased when the paging message is received and decoded, and then increased thereafter. These and many other features and examples are described herein.

In some implementations, the baseband circuitry 1004 can include one or more audio digital signal processor(s) (DSP) 1004F. The audio DSPs 1004F can include elements for compression/decompression and echo cancellation and can include other suitable processing elements in other implementations. Components of the baseband circuitry can be suitably combined in a single chip, a single chipset, or disposed on a same circuit board in some implementations.

In some implementations, some or all of the constituent components of the baseband circuitry 1004 and the application circuitry 1002 can be implemented together such as, for example, on a system on a chip (SOC).

In some implementations, the baseband circuitry 1004 can provide for communication compatible with one or more radio technologies. For example, in some implementations, the baseband circuitry 1004 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1004 is configured to support radio communications of more than one wireless protocol can be referred to as multi-mode baseband circuitry.

RF circuitry 1006 can enable communication with wireless networks using modulated electromagnetic radiation through a non-solid medium. In various implementations, the RF circuitry 1006 can include switches, filters, amplifiers, etc. to facilitate the communication with the wireless network. RF circuitry 1006 can include a receive signal path which can include circuitry to down-convert RF signals received from the FEM circuitry 1008 and provide baseband signals to the baseband circuitry 1004. RF circuitry 1006 can also include a transmit signal path which can include circuitry to up-convert baseband signals provided by the baseband circuitry 1004 and provide RF output signals to the FEM circuitry 1008 for transmission.

In some implementations, the receive signal path of the RF circuitry 1006 can include mixer circuitry 1006A, amplifier circuitry 1006B and filter circuitry 1006C. In some implementations, the transmit signal path of the RF circuitry 1006 can include filter circuitry 1006C and mixer circuitry 1006A. RF circuitry 1006 can also include synthesizer circuitry 1006D for synthesizing a frequency for use by the mixer circuitry 1006A of the receive signal path and the transmit signal path. In some implementations, the mixer circuitry 1006A of the receive signal path can be configured to down-convert RF signals received from the FEM circuitry 1008 based on the synthesized frequency provided by synthesizer circuitry 1006D. The amplifier circuitry 1006B can be configured to amplify the down-converted signals and the filter circuitry 1006C can be a low-pass filter (LPF) or band-pass filter (BPF) configured to remove unwanted signals from the down-converted signals to generate output baseband signals. Output baseband signals can be provided to the baseband circuitry 9404 for further processing. In some implementations, the output baseband signals can be zero-frequency baseband signals, although this is not a requirement. In some implementations, mixer circuitry 1006A of the receive signal path can comprise passive mixers, although the scope of the implementations is not limited in this respect.

In some implementations, the mixer circuitry 1006A of the transmit signal path can be configured to up-convert input baseband signals based on the synthesized frequency provided by the synthesizer circuitry 1006D to generate RF output signals for the FEM circuitry 1008. The baseband signals can be provided by the baseband circuitry 1004 and can be filtered by filter circuitry 1006C. In some implementations, the mixer circuitry 06A of the receive signal path and the mixer circuitry 1906A of the transmit signal path can include two or more mixers and can be arranged for quadrature down conversion and up conversion, respectively. In some implementations, the mixer circuitry 1006A of the receive signal path and the mixer circuitry 1006A of the transmit signal path can include two or more mixers and can be arranged for image rejection (e.g., Hartley image rejection). In some implementations, the mixer circuitry 06A of the receive signal path and the mixer circuitry '906A can be arranged for direct down conversion and direct up conversion, respectively. In some implementations, the mixer circuitry 10069 of the receive signal path and the mixer circuitry 1006A of the transmit signal path can be configured for super-heterodyne operation.

In some implementations, the output baseband signals, and the input baseband signals can be analog baseband signals, although the scope of the implementations is not limited in this respect. In some alternate implementations, the output baseband signals, and the input baseband signals can be digital baseband signals. In these alternate implementations, the RF circuitry 1006 can include analog-to-digital converter (ADC) and digital-to-analog converter (DAC) circuitry and the baseband circuitry 1004 can include a digital baseband interface to communicate with the RF circuitry 1006.

In some dual-mode implementations, a separate radio IC circuitry can be provided for processing signals for each spectrum, although the scope of the implementations is not limited in this respect. In some implementations, the synthesizer circuitry 1006D can be a fractional-N synthesizer or a fractional N/N+1 synthesizer, although the scope of the implementations is not limited in this respect as other types of frequency synthesizers can be suitable. For example, synthesizer circuitry 1006D can be a delta-sigma synthesizer, a frequency multiplier, or a synthesizer comprising a phase-locked loop with a frequency divider.

The synthesizer circuitry 1006D can be configured to synthesize an output frequency for use by the mixer circuitry 1006A of the RF circuitry 1006 based on a frequency input and a divider control input. In some implementations, the synthesizer circuitry 1006D can be a fractional N/N+1 synthesizer.

In some implementations, frequency input can be provided by a voltage-controlled oscillator (VCO), although that is not a requirement. Divider control input can be provided by either the baseband circuitry 1004 or the applications circuitry 1002 depending on the desired output frequency. In some implementations, a divider control input (e.g., N) can be determined from a look-up table based on a channel indicated by the applications circuitry 1002.

Synthesizer circuitry 1006D of the RF circuitry 1006 can include a divider, a delay-locked loop (DLL), a multiplexer and a phase accumulator. In some implementations, the divider can be a dual modulus divider (DMD), and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1006D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1006 can include an IQ/polar converter.

FEM circuitry 1008 can include a receive signal path which can include circuitry configured to operate on RF signals received from one or more antennas 1010, amplify the received signals and provide the amplified versions of the received signals to the RF circuitry 1006 for further processing. FEM circuitry 1008 can also include a transmit signal path which can include circuitry configured to amplify signals for transmission provided by the RF circuitry 1006 for transmission by one or more of the one or more antennas 1010. In various implementations, the amplification through the transmit or receive signal paths can be done solely in the RF circuitry 1006, solely in the FEM circuitry 1008, or in both the RF circuitry 1006 and the FEM circuitry 1008.

In some implementations, the FEM circuitry 1008 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1006). The transmit signal path of the FEM circuitry 1008 can include a power amplifier (PA) to amplify input RF signals (e.g., provided by RF circuitry 1006), and one or more filters to generate RF signals for subsequent transmission (e.g., by one or more of the one or more antennas 1010).

In some implementations, the PMC 1012 can manage power provided to the baseband circuitry 1004. In particular, the PMC 1012 can control power-source selection, voltage scaling, battery charging, or DC-to-DC conversion. The PMC 1012 can often be included when the device 1000 is capable of being powered by a battery, for example, when the device is included in a UE. The PMC 1012 can increase the power conversion efficiency while providing desirable implementation size and heat dissipation characteristics.

While FIG. 10 shows the PMC 1012 coupled only with the baseband circuitry 1004. However, in other implementations, the PMC 1012 can be additionally or alternatively coupled with, and perform similar power management operations for, other components such as, but not limited to, application circuitry 1002, RF circuitry 1006, or FEM circuitry 1008.

In some implementations, the PMC 1012 can control, or otherwise be part of, various power saving mechanisms of the device 1000. For example, if the device 1000 is in an RRC_Connected state, where it is still connected to the RAN node as it expects to receive traffic shortly, then it can enter a state known as Discontinuous Reception Mode (DRX) after a period of inactivity. During this state, the device 1000 can power down for brief intervals of time and thus save power.

If there is no data traffic activity for an extended period of time, then the device 1000 can transition off to an RRC_Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state; in order to receive data, it can transition back to RRC_Connected state.

An additional power saving mode can allow a device to be unavailable to the network for periods longer than a paging interval (ranging from seconds to a few hours). During this time, the device is unreachable to the network and can power down completely. Any data sent during this time incurs a large delay and it is assumed the delay is acceptable.

Processors of the application circuitry 1002 and processors of the baseband circuitry 1004 can be used to execute elements of one or more instances of a protocol stack. For example, processors of the baseband circuitry 1004, alone or in combination, can be used execute Layer 3, Layer 2, or Layer 1 functionality, while processors of the baseband circuitry 1004 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 11:
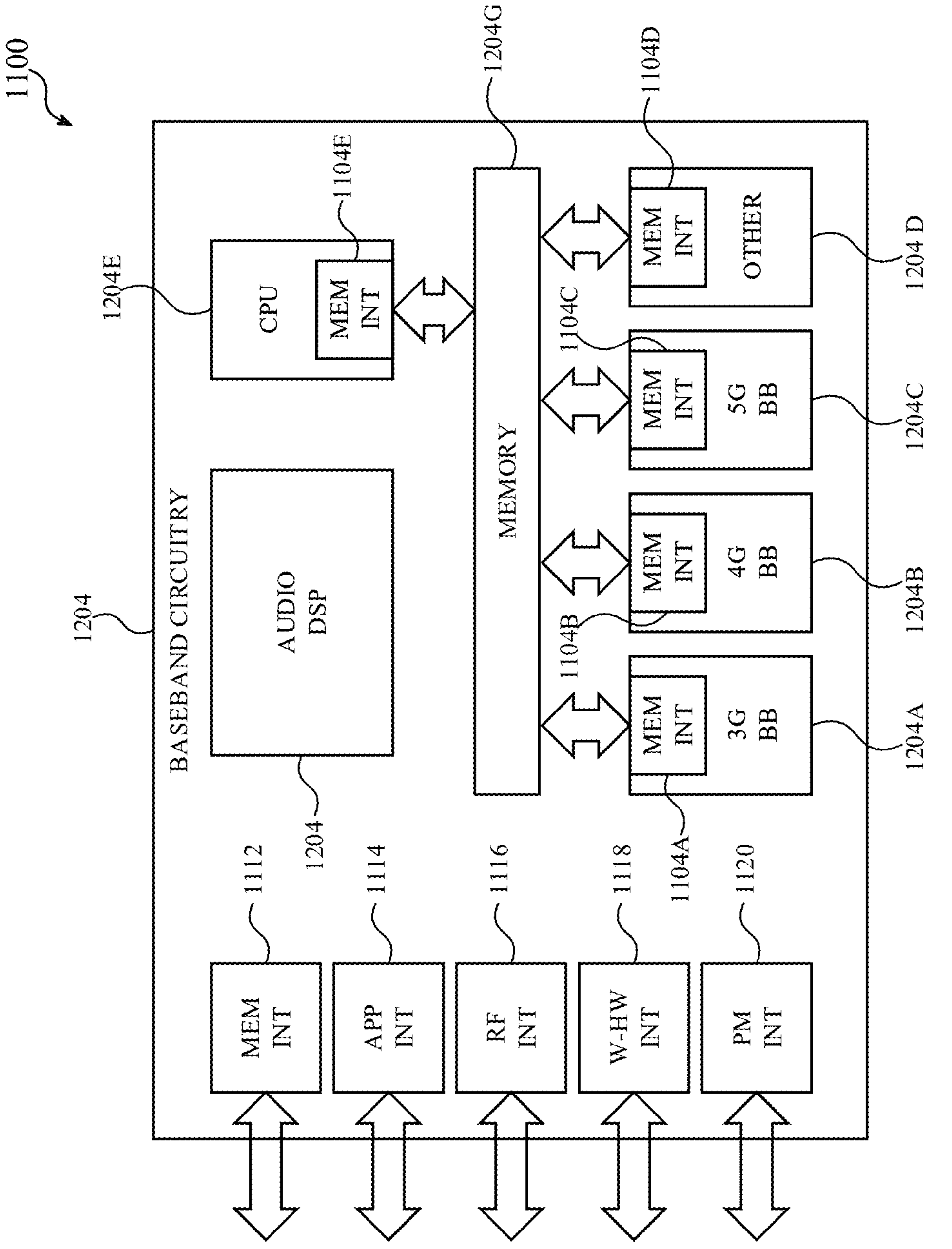
FIG. 11 is a diagram of example interfaces of baseband circuitry according to one or more implementations described herein.

FIG. 11 is a diagram of example interfaces 1100 of baseband circuitry according to one or more implementations described herein. One or more components or features of example interferences 1120 can correspond to one or more components or features described above or elsewhere. Baseband circuitry 1104 can comprise processors 1104A, 1104B, 1104C, 1104D, and 1104E and a memory 1104G utilized by said processors. Each of the processors 1104A, 1104B, 1104C, 1104D, and 1104E can include a memory interface, 1106A, 1106B, 1106C, 1106D, and 1106E, respectively, to send/receive data to/from the memory 1104G. Baseband circuitry can be a component of a UE and/or another type of device or system capable of transmitting and/or receiving wireless signals.

In some implementations, memory 1104G can receive, store, and/or provide information and instructions for MIMO with MTPL. UE 210, baseband circuitry 1104, RF circuitry 1104, or one or more other components of UE 210 or baseband circuitry 1104, can operate with SIMs. UE 210 or baseband circuitry 1104 can determine a LUT for adjusting an MTPL for a first SIM when a second SIM is to receive a paging message. The adjusted MTPL can be based on one or more factors or conditions, such as an operating status of UE 210, a mode of operation of the SIMs, a signal strength or network condition between UE 210 and the network, etc. The MTPL for the first SIM can be decreased when the paging message is received and decoded, and then increased thereafter. These and many other features and examples are described herein.

Baseband circuitry 1104 can further include one or more interfaces to communicatively couple to other circuitries/devices, such as a memory interface 1112 (e.g., an interface to send/receive data to/from memory external to baseband circuitry 1104), an application circuitry interface 1114 (e.g., an interface to send/receive data to/from the application circuitry as described herein), an RF circuitry interface 1116, a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1120 (e.g., an interface to send/receive power or control signals to/from a PMC).

Figure 12:
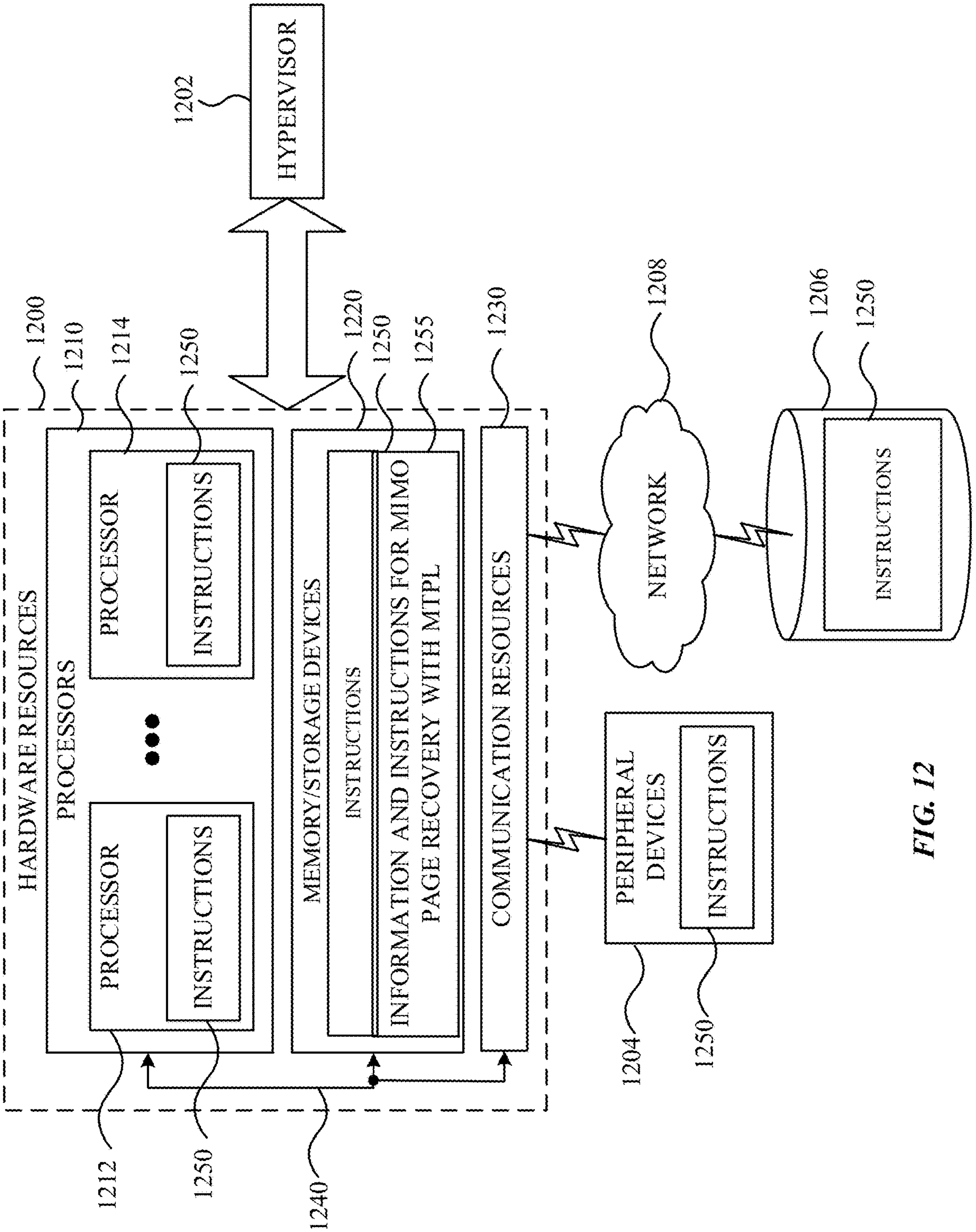
FIG. 12 is a block diagram illustrating components, according to one or more implementations described herein, able to read instructions from a machine-readable or computer-readable medium (e.g., a non-transitory machine-readable storage medium) and perform any one or more of the methodologies discussed herein.

FIG. 12 is a block diagram illustrating components, according to some example implementations, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1210, and one or more communication resources 1230, each of which can be communicatively coupled via a bus 1240. For implementations where node virtualization (e.g., NFV) is utilized, a hypervisor can be executed to provide an execution environment for one or more network slices/sub-slices to utilize the hardware resources 1200. The hardware resources 1200 can interact with the hypervisor 1202. For example, the hypervisor 1202 can schedule or otherwise manage the hardware resource 1200.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) can include, for example, a processor 1212 and a processor 1214.

The memory/storage devices 1210 can include main memory, disk storage, or any suitable combination thereof. The memory/storage devices 1210 can include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

In some implementations, memory/storage devices 1210 receive and/or store information and instructions 1255 for MIMO with MTPL. UE 210, baseband circuitry 1104, RF circuitry 1104, or one or more other components of UE 210, can operate with SIMs. UE 210 can determine a LUT for adjusting an MTPL for a first SIM when a second SIM is to receive a paging message. The adjusted MTPL can be based on one or more factors or conditions, such as an operating status of UE 210, a mode of operation of the SIMs, a signal strength or network condition between UE 210 and the network, etc. The MTPL for the first SIM can be decreased when the paging message is received and decoded, and then increased thereafter. These and many other features and examples are described herein.

The communication resources 1230 can include interconnection or network interface components or other suitable devices to communicate with one or more peripheral devices 1204 or one or more databases 1206 via a network 1208. For example, the communication resources 1230 can include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 can comprise software, a program, an application, an applet, an app, or other executable code for causing at least any of the processors 1210 to perform any one or more of the methodologies discussed herein. The instructions 1250 can reside, completely or partially, within at least one of the processors 1210 (e.g., within the processor's cache memory), the memory/storage devices 1210, or any suitable combination thereof. Furthermore, any portion of the instructions 1250 can be transferred to the hardware resources 1200 from any combination of the peripheral devices 1204 or the databases 1206. Accordingly, the memory of processors 1210, the memory/storage devices 1210, the peripheral devices 1204, and the databases 1206 are examples of computer-readable and machine-readable media.

Figure 13:
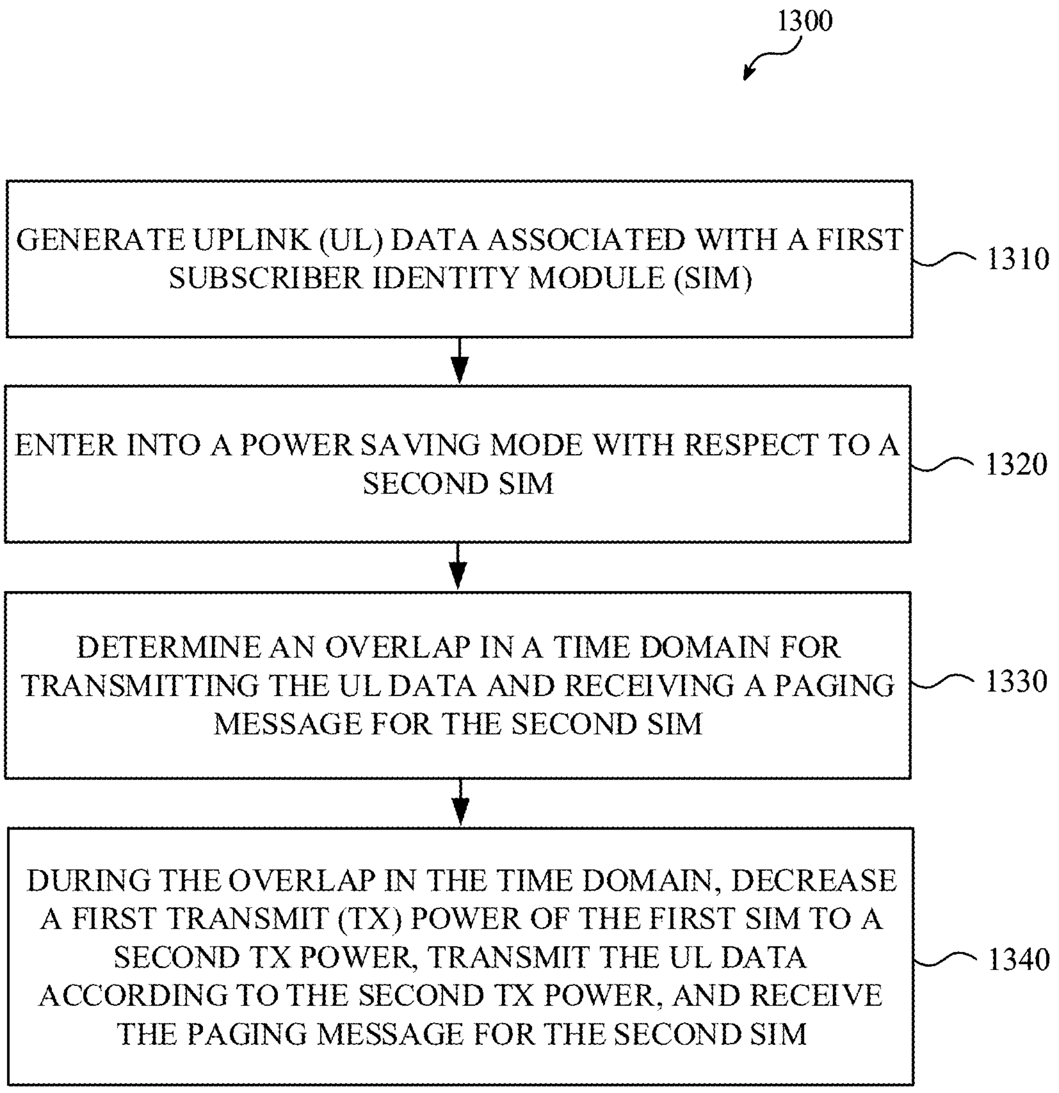
FIG. 13 is a diagram of an example process for MIMO page recovery with MTPL according to one or more implementations described herein.

FIG. 13 is a diagram of an example process 1300 for MIMO page recovery with MTPL according to one or more implementations described herein. Process 1300 can be implemented by UE 210 or one or more components thereof, such as baseband circuitry 1206, RF circuitry 1208, etc. In some implementations, some or all of process 1300 can be performed by one or more other systems or devices, including one or more of the devices of FIG. 2. Additionally, process 1300 can include one or more fewer, additional, differently ordered and/or arranged operations than those shown in FIG. 13. In some implementations, some or all of the operations of process 1300 can be performed independently, successively, simultaneously, etc., of one or more of the other operations of process 1300. As such, the techniques described herein are not limited to a number, sequence, arrangement, timing, etc., of the operations or processes depicted in FIG. 13.

Process 1300 can include generating uplink (UL) data associated with a first subscriber identity module (SIM) of the UE (block 1310). Process 1300 can include entering into a power saving mode with respect to a second SIM (block 1320). Process 1300 can include determining an overlap in a time domain for transmitting the UL data and receiving a paging message for the second SIM (block 1330). Process 1300 can include during the overlap in the time domain, decreasing a first transmit (Tx) power of the first SIM to a second Tx power, causing the UL data to be transmitted according to the second Tx power, and processing the paging message for the second SIM (block 1340). These and many other features, examples, and examples can be combined in one or more ways as described herein.

Figure 14:
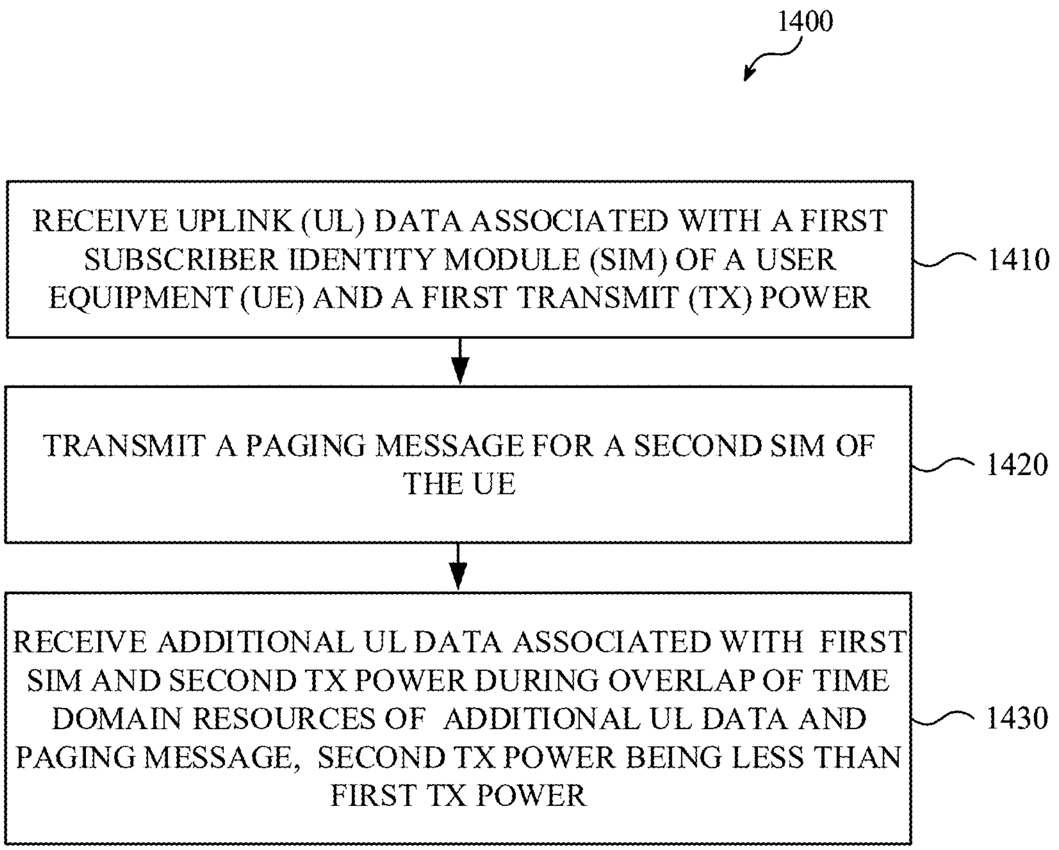
FIG. 14 is a diagram of an example process for MIMO page recovery with MTPL according to one or more implementations described herein.

FIG. 14 is a diagram of an example process 1400 for MIMO page recovery with MTPL according to one or more implementations described herein. Process 1400 can be implemented by UE 210 or one or more components thereof, such as baseband circuitry 1206, RF circuitry 1208, etc. In some implementations, some or all of process 1400 can be performed by one or more other systems or devices, including one or more of the devices of FIG. 2. Additionally, process 1400 can include one or more fewer, additional, differently ordered and/or arranged operations than those shown in FIG. 14. In some implementations, some or all of the operations of process 1400 can be performed independently, successively, simultaneously, etc., of one or more of the other operations of process 1400. As such, the techniques described herein are not limited to a number, sequence, arrangement, timing, etc., of the operations or processes depicted in FIG. 14.

Process 1400 can include receiving uplink (UL) data associated with a first subscriber identity module (SIM) of a user equipment (UE) and a first transmit (Tx) power (block 1410). Process 1400 can include transmitting a paging message for a second SIM of the UE (block 1420). Process 1400 can include receiving additional UL data associated with the first SIM and a second Tx power during an overlap of time domain resources of the additional UL data and the paging message, the second Tx power being less than the first Tx power (block 1430). These and many other features, examples, and examples can be combined in one or more ways as described herein.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which can also include one or more of the examples described herein, baseband circuitry can comprise: a memory; and one or more processors configured to, when executing instructions stored in the memory, cause the baseband circuitry to: generate uplink (UL) data associated with a first subscriber identity module (SIM); enter into a power saving mode with respect to a second SIM; determine an overlap in a time domain for transmitting the UL data and receiving a paging message for the second SIM; during the overlap in the time domain, decrease a first transmit (Tx) power of the first SIM to a second Tx power, transmit the UL data according to the second Tx power, and receive the paging message for the second SIM.

In example 2, which can also include one or more of the examples described herein, the power saving mode comprises and IDLE mode.

In example 3, which can also include one or more of the examples described herein, first Tx power comprises a first maximum transmit power level (MTPL) and the second Tx power comprises a second MTPL.

In example 4, which can also include one or more of the examples described herein, the one or more processors are configured to cause the baseband circuitry to: determine whether a current Tx power is less than the second Tx power; and when the current Tx power is less than or equal to the second Tx power, transmit the UL data according to the current Tx power.

In example 5, which can also include one or more of the examples described herein, the one or more processors are configured to cause the baseband circuitry to: when the current Tx power is greater than the second Tx power, decrease the current Tx power to the second Tx power; and transmit the UL data according to the second Tx power.

In example 6, which can also include one or more of the examples described herein, the one or more processors are configured to cause the baseband circuitry to: decode paging message; and respond to the paging message using the second SIM.

In example 7, which can also include one or more of the examples described herein, the one or more processors are configured to cause the baseband circuitry to: update the second Tx power to the first Tx power; and generate additional UL data to be transmitted using the first Tx power.

In example 8, which can also include one or more of the examples described herein, the one or more processors are configured to cause the baseband circuitry to: update the second Tx power to the first Tx power in response to determining that the paging message has been received.

In example 9, which can also include one or more of the examples described herein, the one or more processors are configured to cause the baseband circuitry to: decode the paging message; and update the second Tx power to the first Tx power in response to determining that the paging message has been decoded.

In example 10, which can also include one or more of the examples described herein, the one or more processors are configured to cause the baseband circuitry to: update the second Tx power to the first Tx power regardless of whether the paging message has been received or decoded.

In example 11, which can also include one or more of the examples described herein, the one or more processors are configured to cause the baseband circuitry to: determine a lookup table (LUT) that includes the second Tx power of the first SIM.

In example 12, which can also include one or more of the examples described herein, the LUT comprises a change in a first maximum Tx power to a second maximum Tx power that is greater than or equal to the second Tx power.

In example 13, which can also include one or more of the examples described herein, the second Tx power comprises a Tx power backoff.

In example 14, which can also include one or more of the examples described herein, the Tx power backoff is determined based on: a current Tx power of the first SIM relative to an automatic gain control (AGC) of the second SIM.

In example 15, which can also include one or more of the examples described herein, the Tx power backoff is determined based on uplink (UL) frequency resources for the UL data and downlink (DL) frequency resources for the paging message.

In example 16, which can also include one or more of the examples described herein, the Tx power backoff is determined based on a proximity in a frequency domain between uplink (UL) frequency resources for the UL data and downlink (DL) frequency resources for the paging message.

In example 17, which can also include one or more of the examples described herein, the Tx power backoff is determined based on: a current Tx power of the first SIM relative to an automatic gain control (AGC) of the second SIM, and a proximity in a frequency domain between uplink (UL) frequency resources for the UL data and downlink (DL) frequency resources for the paging message.

In example 18, which can also include one or more of the examples described herein, a method can comprise: generating uplink (UL) data associated with a first subscriber identity module (SIM) of the UE; entering into a power saving mode with respect to a second SIM; determining an overlap in a time domain for transmitting the UL data and receiving a paging message for the second SIM; during the overlap in the time domain, decreasing a first transmit (Tx) power of the first SIM to a second Tx power, causing the UL data to be transmitted according to the second Tx power, and processing the paging message for the second SIM.

In example 19, which can also include one or more of the examples described herein, a non-transitory computer-readable medium can comprise one or more instructions that when executed by one or more processors cause the one or more processors to: generate uplink (UL) data associated with a first subscriber identity module (SIM); enter into a power saving mode with respect to a second SIM; determine an overlap in a time domain for transmitting the UL data and receiving a paging message for the second SIM; during the overlap in the time domain, decrease a first transmit (Tx) power of the first SIM to a second Tx power, transmit the UL data according to the second Tx power, and receive the paging message for the second SIM.

In example 20, which can also include one or more of the examples described herein, the overlap of the time domain comprises at least one slot for allocated transmitting the additional UL data coinciding with at least one slot allocated for transmitting the paging message.

In example 21, which can also include one or more of the examples described herein, a base station can comprise: a memory; and one or more processors configured to, when executing instructions stored in the memory, cause the base station to: receive uplink (UL) data associated with a first subscriber identity module (SIM) of a user equipment (UE) and a first transmit (Tx) power; transmit a paging message for a second SIM of the UE; and receive additional UL data associated with the first SIM and a second Tx power during an overlap of time domain resources of the additional UL data and the paging message, the second Tx power being less than the first Tx power.

In example 22, which can also include one or more of the examples described herein, the overlap of time domain resources comprise at least one slot for allocated transmitting the additional UL data coinciding with at least one slot allocated for transmitting the paging message.

In example 23, which can also include one or more of the examples described herein, the first Tx power comprises a first maximum transmit power level (MTPL) and the second Tx power comprises a second MTPL.

In example 24, which can also include one or more of the examples described herein, when a current Tx power is less than or equal to the second Tx power, the additional UL data is received according to the current Tx power.

In example 25, which can also include one or more of the examples described herein, when a current Tx power is less than or equal to the second Tx power, the additional UL data is received according to the second Tx power.

In example 26, which can also include one or more of the examples described herein, the one or more processors are configured to cause the base station to: receive further UL data according to the first Tx power after transmitting the paging message for the second SIM.

In example 27, which can also include one or more of the examples described herein, the additional UL data is received according to a lookup table (LUT) that includes the second Tx power of the first SIM.

In example 28, which can also include one or more of the examples described herein, the LUT comprises a change in a first maximum Tx power to a second maximum Tx power that is greater than or equal to the second Tx power.

In example 29, which can also include one or more of the examples described herein, the second Tx power comprises a Tx power backoff.

In example 30, which can also include one or more of the examples described herein, the Tx power backoff is based on a current Tx power of the first SIM relative to an automatic gain control (AGC) of the second SIM.

In example 31, which can also include one or more of the examples described herein, the Tx power backoff is determined based on uplink (UL) frequency resources for the UL data and downlink (DL) frequency resources for the paging message.

In example 32, which can also include one or more of the examples described herein, the Tx power backoff is based on a proximity in a frequency domain between uplink (UL) frequency resources for the UL data and downlink (DL) frequency resources for the paging message.

In example 33, which can also include one or more of the examples described herein, the Tx power backoff is based on: a current Tx power of the first SIM relative to an automatic gain control (AGC) of the second SIM, and a proximity in a frequency domain between uplink (UL) frequency resources for the UL data and downlink (DL) frequency resources for the paging message.

In example 34, which can also include one or more of the examples described herein, a method can comprise: receiving uplink (UL) data associated with a first subscriber identity module (SIM) of a user equipment (UE) and a first transmit (Tx) power; transmitting a paging message for a second SIM of the UE; and receiving additional UL data associated with the first SIM and a second Tx power during an overlap of time domain resources of the additional UL data and the paging message, the second Tx power being less than the first Tx power.

In example 35, which can also include one or more of the examples described herein, the overlap of time domain resources comprise at least one slot for allocated transmitting the additional UL data coinciding with at least one slot allocated for transmitting the paging message.

In example 36, which can also include one or more of the examples described herein, the first Tx power comprises a first maximum transmit power level (MTPL) and the second Tx power comprises a second MTPL.

In example 37, which can also include one or more of the examples described herein, when a current Tx power is less than or equal to the second Tx power, the additional UL data is received according to the current Tx power.

In example 38, which can also include one or more of the examples described herein, when a current Tx power is less than or equal to the second Tx power, the additional UL data is received according to the second Tx power.

In example 39, which can also include one or more of the examples described herein, a non-transitory computer-readable medium can comprise: one or more instructions that when executed by one or more processors cause the one or more processors to: process uplink (UL) data associated with a first subscriber identity module (SIM) of a user equipment (UE) and a first transmit (Tx) power; generate a paging message for a second SIM of the UE; and process additional UL data associated with the first SIM and a second Tx power during an overlap of time domain resources of the additional UL data and the paging message, the second Tx power being less than the first Tx power.

In example 40, which can also include one or more of the examples described herein, the overlap of the time domain comprises at least one slot for allocated transmitting the additional UL data coinciding with at least one slot allocated for transmitting the paging message.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature can have been disclosed with respect to only one of several implementations, such feature can be combined with one or more other features of the other implementations as can be desired and advantageous for any given application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context can indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled to minimize risks of unintentional or unauthorized access or use, and the nature of authorized use should be clearly indicated to users.

What is claimed is:

1. A base station, comprising:
a memory; and
one or more processors configured to, when executing instructions stored in the memory, cause the base station to:
receive uplink (UL) data associated with a first subscriber identity module (SIM) of a user equipment (UE) and a first transmit (Tx) power;
transmit a paging message for a second SIM of the UE; and
receive additional UL data associated with the first SIM and a second Tx power during an overlap of time domain resources of the additional UL data and the paging message, the second Tx power being less than the first Tx power.

2. The base station of claim 1, wherein the overlap of time domain resources comprise at least one slot allocated for transmitting the additional UL data coinciding with at least one slot allocated for transmitting the paging message.

3. The base station of claim 1, wherein the first Tx power comprises a first maximum transmit power level (MTPL) and the second Tx power comprises a second MTPL.

4. The base station of claim 3, wherein:
when a current Tx power is less than or equal to the second Tx power,
the additional UL data is received according to the current Tx power.

5. The base station of claim 3, wherein:
when a current Tx power is less than or equal to the second Tx power,
the additional UL data is received according to the second Tx power.

6. The base station of claim 1, wherein the one or more processors are configured to cause the base station to:
receive further UL data according to the first Tx power after transmitting the paging message for the second SIM.

7. The base station of claim 1, wherein the additional UL data is received according to a lookup table (LUT) that includes the second Tx power of the first SIM.

8. The base station of claim 7, wherein the LUT comprises a change in a first maximum Tx power to a second maximum Tx power that is greater than or equal to the second Tx power.

9. The base station of claim 8, wherein the second Tx power comprises a Tx power backoff.

10. The base station of claim 9, wherein the Tx power backoff is based on a current Tx power of the first SIM relative to an automatic gain control (AGC) of the second SIM.

11. The base station of claim 9, wherein the Tx power backoff is determined based on UL frequency resources for the UL data and downlink (DL) frequency resources for the paging message.

12. The base station of claim 9, wherein the Tx power backoff is based on a proximity in a frequency domain between UL frequency resources for the UL data and downlink (DL) frequency resources for the paging message.

13. The base station of claim 9, wherein the Tx power backoff is based on:
a current Tx power of the first SIM relative to an automatic gain control (AGC) of the second SIM, and
a proximity in a frequency domain between UL frequency resources for the UL data and downlink (DL) frequency resources for the paging message.

14. A method, performed by a base station, the method comprising:
receiving uplink (UL) data associated with a first subscriber identity module (SIM) of a user equipment (UE) and a first transmit (Tx) power;
transmitting a paging message for a second SIM of the UE; and
receiving additional UL data associated with the first SIM and a second Tx power during an overlap of time domain resources of the additional UL data and the paging message, the second Tx power being less than the first Tx power.

15. The method of claim 14, wherein the overlap of time domain resources comprise at least one slot allocated for transmitting the additional UL data coinciding with at least one slot allocated for transmitting the paging message.

16. The method of claim 14, wherein the first Tx power comprises a first maximum transmit power level (MTPL) and the second Tx power comprises a second MTPL.

17. The method of claim 16, wherein:
when a current Tx power is less than or equal to the second Tx power,
the additional UL data is received according to the current Tx power.

18. The method of claim 16, wherein:
when a current Tx power is less than or equal to the second Tx power,
the additional UL data is received according to the second Tx power.

19. A non-transitory computer-readable medium, comprising:

one or more instructions that when executed by one or more processors cause the one or more processors to:

process uplink (UL) data associated with a first subscriber identity module (SIM) of a user equipment (UE) and a first transmit (Tx) power;

generate a paging message for a second SIM of the UE; and process additional UL data associated with the first SIM and a second Tx power during an overlap of time domain resources of the additional UL data and the paging message, the second Tx power being less than the first Tx power.

20. The non-transitory computer-readable medium of claim 19, wherein the overlap of the time domain resources comprises at least one slot allocated for transmitting the additional UL data coinciding with at least one slot allocated for transmitting the paging message.

* * * * *